US011226538B2

(12) United States Patent
Marandi et al.

(10) Patent No.: US 11,226,538 B2
(45) Date of Patent: Jan. 18, 2022

(54) THIN-FILM OPTICAL PARAMETRIC OSCILLATORS

(71) Applicant: California Institute of Technology, Pasadena, CA (US)

(72) Inventors: Alireza Marandi, Pasadena, CA (US); Luis Ledezma, La Crescenta, CA (US); Yinglun Xu, Wuhan (CN); Ryan M. Briggs, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/813,462

(22) Filed: Mar. 9, 2020

(65) Prior Publication Data
US 2020/0285131 A1 Sep. 10, 2020

Related U.S. Application Data

(60) Provisional application No. 62/815,203, filed on Mar. 7, 2019.

(51) Int. Cl.
*G02F 1/39* (2006.01)
*G02F 1/35* (2006.01)

(52) U.S. Cl.
CPC ............ *G02F 1/39* (2013.01); *G02F 1/3542* (2021.01); *G02F 1/392* (2021.01); *G02F 2203/15* (2013.01)

(58) Field of Classification Search
CPC .......... G02F 1/3542; G02F 1/39; G02F 1/392; G02F 2203/15
See application file for complete search history.

(56) References Cited

U.S. PATENT DOCUMENTS

| | | | | |
|---|---|---|---|---|
| 4,859,876 A | * | 8/1989 | Dirk .................. | G02F 1/065 359/245 |
| 5,546,220 A | * | 8/1996 | Endo ................. | G02F 1/377 359/332 |
| 5,574,818 A | * | 11/1996 | Krivoshlykov ..... | G02F 1/395 385/122 |
| 6,344,921 B1 | * | 2/2002 | Galvanauskas ..... | G02F 1/395 359/332 |
| 6,856,737 B1 | * | 2/2005 | Parker ............... | G02F 1/353 385/122 |

(Continued)

OTHER PUBLICATIONS

Chang, L., et al., "Thin film wavelength converters for photonic integrated circuits", Optica, May 2016, pp. 531-535, vol. 3, No. 5.

(Continued)

*Primary Examiner* — Daniel Petkovsek
(74) *Attorney, Agent, or Firm* — Gates & Cooper LLP

(57) ABSTRACT

An optical parametric oscillator (OPO) including a thin film waveguide including a material having a second order nonlinear susceptibility generating an electromagnetic wave in response to pump electromagnetic wave inputted into the thin film waveguide. The electromagnetic wave has a first wavelength or first set of wavelengths longer than a second wavelength or second set of wavelengths of the pump electromagnetic wave. The thin film waveguide has a thickness on the order of the first wavelength or the first set of wavelengths in the thin film waveguide so as to guide the output electromagnetic wave along the thin film waveguide.

22 Claims, 32 Drawing Sheets

(56) References Cited

U.S. PATENT DOCUMENTS

| | | | | |
|---|---|---|---|---|
| 7,200,308 | B2* | 4/2007 | Hochberg | B82Y 20/00 385/122 |
| 7,286,738 | B2* | 10/2007 | Yamada | B82Y 20/00 385/122 |
| 8,169,692 | B2* | 5/2012 | Rice | G02F 1/395 359/330 |
| 9,620,489 | B2* | 4/2017 | Lipson | H01L 25/167 |
| 9,778,543 | B1* | 10/2017 | Zlatanovic | G02F 1/1326 |

OTHER PUBLICATIONS

Wang, C., et al., "Ultrahigh-efficiency wavelength conversion in nanophotonic periodically poled lithium niobate waveguides", Optica, Nov. 2018, pp. 1438-1441, vol. 5, No. 11.

Roux, S., et al., "Low-loss orientation-patterned GaSb waveguides for mid-infared parametric conversion", Optical Materials Express, Aug. 2017, pp. 3011-3016, vol. 7, No. 8.

Fedorova, K.A., et al., "Second harmonic generation in a low-loss orientation-patterned GaAs waveguide", Optics Express, Jul. 2013, pp. 16424-16430, vol. 21, No. 14.

Chang, L., et al., "Heterogeneously Integrated GaAs Waveguides on Insulator for Efficient Frequency Conversion", Advanced Science News, 2018, pp. 1-7.

Chiles, J., et al., "Mid-infared integrated waveguide modulators based on silicon-on-lithium-niobate photonics", Optica, Nov. 2014, pp. 350-355, vol. 1, No. 5.

Rao, A., et al., "Heterogeneous Thin-Film Lithium Niobate Integrated Photonics for Electrooptics and Nonlinear Optics", IEEE Journal of Selected Topics in Quantum Electronics, Nov./Dec. 2018, pp. 1-12, vol. 24, No. 6.

Wang, C., et al., "Second-harmonic generation in nanophotonic PPLN waveguides with ultrahigh efficiencies", Conference on Lasers and Electro-Optics, Optical Society of America, 2018, pp. 1-2.

Schunemann, P.G. et al., "HVPE of Orientation-Patterned Gallium Phosphide (OPGaP) with Novel Quasi-Phasematched Device Structures", Conference on Lasers and Electro-Optics, Optical Society of America, May 2018, pp. 1-2.

Chen, X., et al., "Quasi-phase matching via femtosecond laser induced domain inversion in lithium niobate waveguides", Optics Letters, 2016, pp. 1-5, vol. 41, No. 11.

Zareian, N., et al., "Static and dynamic characteristics of integrated semiconductor optical parametric oscillators", J. Opt. Soc. Am. B, Aug. 2013, pp. 2306-2317, vol. 30, No. 8.

Eckardt, R.C., et al., "Optical parametric oscillator frequency tuning and control", J. Opt. Soc. Am. B, Mar. 1991, pp. 646-667, vol. 8, No. 3.

Mosca, S., et al., "Modulation Instability Induced Frequency Comb Generation in a Continuously Pumped Optical Parametric Oscillator", Physical Review Letters, Aug. 2018, pp. 1-19, vol. 121, No. 9.

Wang, C., et al., "Integrated Lithium Niobate Electro-optic Modulators Operating at CMOS-compatible Voltages", Nature, Oct. 2018, pp. 1-12, vol. 562, No. 7725.

* cited by examiner

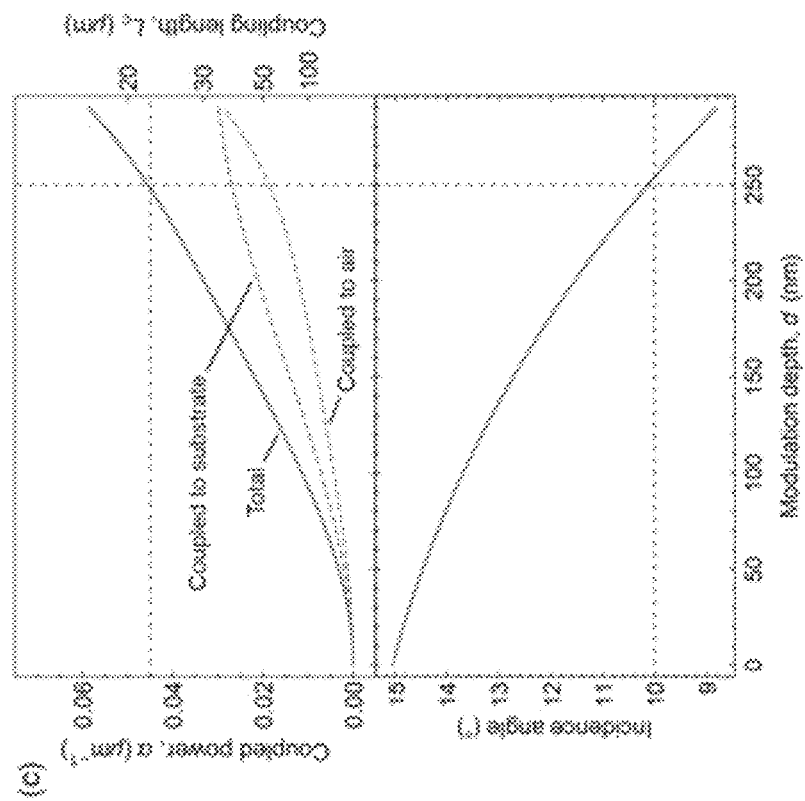
Figure 14C
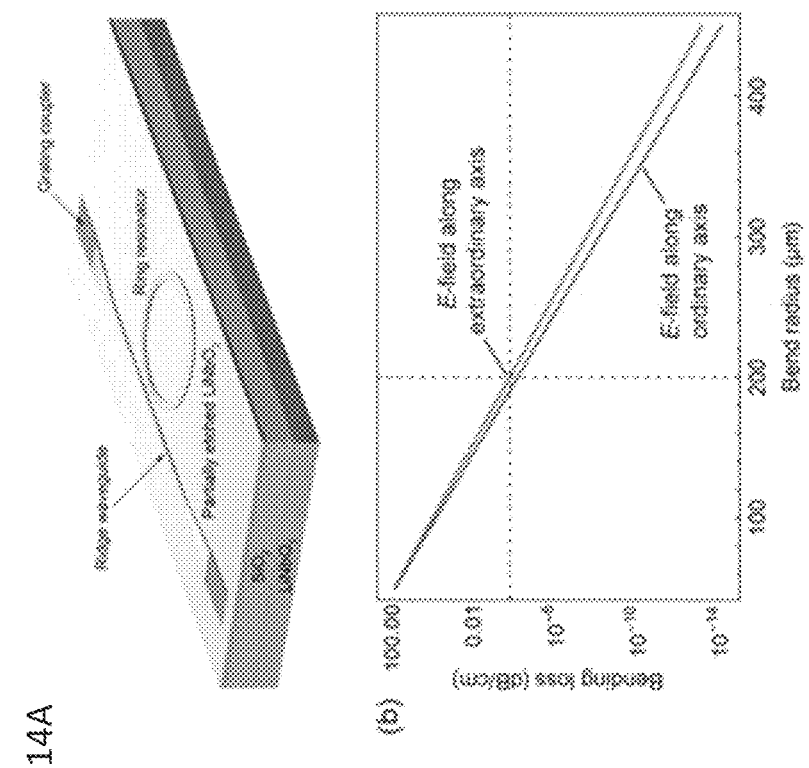
Figure 14A
Figure 14B

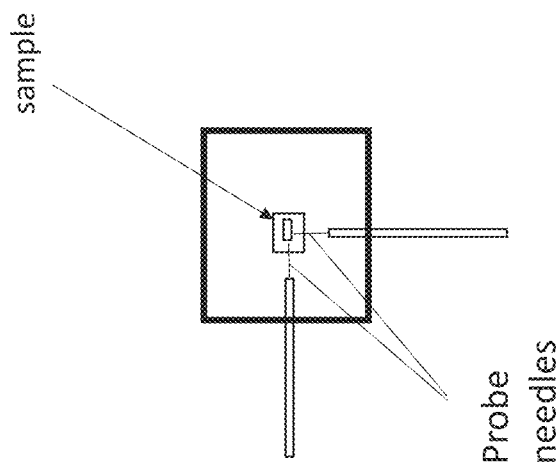
Figure 20C
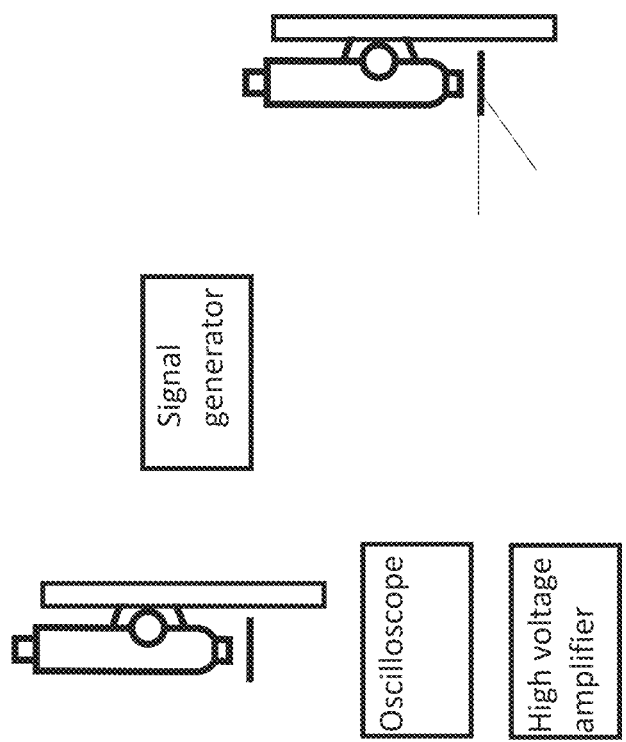
Figure 20B
Figure 20A

THIN-FILM OPTICAL PARAMETRIC OSCILLATORS

CROSS REFERENCE TO RELATED APPLICATIONS

This application claims the benefit under 35 U.S.C. Section 119(e) of commonly-assigned U.S. provisional patent application Ser. No. 62/815,203, filed on Mar. 7, 2019, by Luis Ledezma, Yinglun Xu, Ryan Briggs, and Alireza Marandi, entitled "THIN-FILM OPTICAL PARAMETRIC OSCILLATORS," Client reference CIT 8212-P, which application is incorporated by reference herein.

STATEMENT REGARDING FEDERALLY SPONSORED RESEARCH AND DEVELOPMENT

This invention was made with government support under Grant No. 80NM0018D004 awarded by NASA (JPL). The government has certain rights in the invention.

BACKGROUND OF THE INVENTION

1. Field of the Invention

This invention relates to Optical Parametric Oscillators (OPOs) and methods of making the same.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Optical Parametric Oscillators (OPOs) have been known as widely tunable coherent sources for several decades. The versatility of OPOs make them promising for a broad range of applications, including generation of long-wavelength coherent radiation and frequency combs for spectroscopy and medical diagnosis, distance measurements, optical clocks and frequency standards, gyroscopes and other inertial sensors, optical and quantum computing (generation of quantum Mates of light), radar, high speed communication, and generation of ultra short pulses.

To date, however, most OPOs have been implemented using discrete components, including mirrors, lenses, and bulk nonlinear crystals, leading to overall system volume on the order of cubic meters with mass on the order of kilograms. OPO designs based on discrete optical components have limited scalability and manufacturability, and the large volume and mass of such systems are prohibitive for many real-world applications.

The present disclosure reports on the invention of an integrated chip-scale OPO implemented using thin-film quadratic non-linear materials, including dielectrics and semiconductors. We demonstrate several embodiments of such devices.

SUMMARY OF THE INVENTION

The present disclosure describes an optical parametric oscillator (OPO), comprising a thin film waveguide including a material having a second order nonlinear susceptibility generating an output electromagnetic field in response to a pump electromagnetic field inputted into the thin film waveguide. The OPO can be embodied in many ways including, but not limited to, the following.

1. The output electromagnetic field having one or more output wavelengths longer than one or more pump wavelengths of the pump electromagnetic field, and the thin film waveguide has a thickness on the order of the one or more output wavelengths in the thin film waveguide so as to waveguide the electromagnetic field along the thin film waveguide.

2. The OPO of example 1, wherein the thickness of the thin film waveguide is less than 5 micrometers so as to guide a mode associated with the output electromagnetic field with most of its energy confined in an area smaller than 5 micrometers by 5 micrometers.

3. The OPO of example 1, further comprising a resonator coupled to and/or including the thin film waveguide, wherein the resonator is configured to support one or more resonances of the output electromagnetic field and/or the pump electromagnetic field.

4. The OPO of example 3, wherein the resonator includes one or more couplers capable of coupling different spectral contents of the output electromagnetic field or the pump electromagnetic field into and out of the resonator.

5. The OPO of example 4, wherein the couplers are directional couplers and their wavelength selectivity is tuned by a gap size between the waveguide sections of the directional couplers.

6. The OPO of example 5, wherein the resonator only supports resonances for the output electromagnetic field by setting the length of the directional couplers long enough, taking into account the one or more output wavelengths of the output electromagnetic field has a wider mode that couples differently into the resonator than the pump electromagnetic field.

7. The OPO of any of the examples 3-6, wherein the output electromagnetic field comprises an idler electromagnetic field and a signal electromagnetic field, and the couplers are designed so that at least one of the idler electromagnetic field or the signal electromagnetic field resonate in the resonator.

8. The OPO of any of the examples 1-7, wherein the thin film waveguide comprises a cavity bounded by reflectors, wherein the reflectors are configured to create resonances in the cavity for the output electromagnetic field and/or the pump electromagnetic field.

9. The OPO of any of the examples 1-8, further comprising an actuator coupled to the thin film waveguide, the couplers, or parts of the resonator, wherein the actuator can tune an effective refractive index of the pump electromagnetic field and/or an effective refractive index of the output electromagnetic field in at least a portion of the resonator, the couplers, or the waveguide.

10. The OPO of any of the examples 3-9, further comprising an actuator coupled to the thin film waveguide, wherein the resonator comprises a ring resonator and the actuator is configured to tune an optical path length of the resonator so as to change the overlap of the time of arrival of a pulse of the output electromagnetic field and a pulse of the pump electromagnetic field, on each round trip of the output electromagnetic field around the ring resonator.

11. The OPO of any of the examples 1-11, wherein the thin film waveguide and/or the resonator includes a phase matched section that is phase matched for the nonlinear interactions between the pump electromagnetic field and the output electromagnetic field, so as to achieve parametric gain of the output electromagnetic field in the thin film waveguide and/or a resonator coupled to the thin film waveguide.

12. The OPO of example 11, wherein the phase matching for the nonlinear interactions is achieved by quasi-phase matching.

13. The OPO of any of the examples 1-12, wherein the material with the second order nonlinear susceptibility is a ferroelectric material.

14. The OPO of any of the examples 1-13, further comprising a photonic integrated circuit including the thin film waveguide on a substrate.

The present disclosure further describes a method of operating an optical parametric oscillator. The method can be embodied in many ways including, but not limited to, the following.

15. The OPO of any of the examples 1-14 operating at degeneracy such that at least one of the output wavelengths is twice one of the pump wavelengths.

16. The OPO of any of the examples 1-15 wherein the output electromagnetic field comprises a frequency comb comprising a set of equidistant frequency peaks.

17. The OPO of any of the examples 1-16, wherein the output spectrum of the output electromagnetic field is broader than the input spectrum of the pump electromagnetic field, in frequency units measured at the 30-dB level below the peak.

18. The OPO of any of the examples 1-17, wherein the pump electromagnetic field comprises continuous wave or a pulsed electromagnetic field.

The present disclosure further discloses an example method of making an optical parametric oscillator including but not limited to the OPO of any of the examples 1-18. The method can be embodied in many ways including, but not limited to, the following.

19. A method comprising providing a thin film on a substrate, the thin film including a material having a second order nonlinear susceptibility generating an output electromagnetic field in response to a pump electromagnetic field, wherein the generated output electromagnetic field has one or more output wavelengths longer than one or more pump wavelengths of the pump electromagnetic field, and the thin film has a thickness on the order of the one or more output wavelengths; defining a waveguide in the thin film, wherein the waveguide has a lateral width on the order of the one or more output wavelengths in the thin film waveguide so as to guide the output electromagnetic field within the thin film; structuring or spatially modifying the thin film waveguide so as to form the thin film waveguide comprising a phase matching structure; forming a resonator coupled to or comprising the waveguide; and optionally forming at least one coupler or mirror to couple the electromagnetic field into the resonator.

20. The method of example 19, further comprising providing one or more actuators to tune an effective refractive index of the pump electromagnetic field and/or an effective refractive index of the output electromagnetic field in at least a portion of the resonator.

21. The method of examples 19 or 20, wherein the waveguide and resonator are formed using a lithographic process and etching to remove a portion of the thin film structure.

BRIEF DESCRIPTION OF THE DRAWINGS

Referring now to the drawings in which like reference numbers represent corresponding parts throughout:

FIGS. 1A-1C: Conceptual block diagrams of OPOs according to one or more examples described herein, wherein FIG. 1A illustrates a continuous wave (CW), FIG. 1B illustrates a pulsed OPO, and FIG. 1C illustrates an OPO with feedback.

FIGS. 2A-2B: Cross sections of a typical thin-film structure (not to scale) according to one or more examples described herein, wherein FIG. 2A shows an example without a buffer layer and FIG. 2B shows an example with a buffer layer.

FIGS. 3A-3C. Thin-film waveguide geometries according to various examples, wherein FIG. 3A shows a waveguide formed in a partial thickness of the thin film, FIG. 3B shows a waveguide having a thickness extending to the substrate, and FIG. 3C shows a waveguide with a loading material.

FIGS. 5A-5B: Illustration of tuning electrodes fabricated along both sides of a ridge waveguide for electro-optic tuning, according to one or more examples described herein, wherein FIG. 5A is a cross-sectional view and FIG. 5B is a top view.

FIGS. 11A-11B: Geometry of the directional couplers studied, wherein FIG. 11A is a cross sectional view and FIG. 11B is a top view.

FIGS. 12A-12B: Example of coupler for doubly resonant, degenerate OPO, wherein FIG. 12A shows the coupling of the output electromagnetic field from the waveguide to the resonator and FIG. 12B shows confinement of the pump in the waveguide.

FIG. 13A shows the coupling of the longer wavelength electromagnetic field from the waveguide to the resonator and FIG. 13B shows coupling back and forth between the waveguide and the resonator.

FIG. 14A. Diagram of a grating-coupled LNOI waveguide ring resonator device according to one example.

FIG. 14B. Calculated bending loss for the fundamental TE mode supported in a LNOI waveguide with a 700-nm-thick lithium niobate film, with an etch depth of 250 nanometers (nm) and a nominal width of 1.2 micrometers.

FIG. 14C. Calculated grating coupling length and coupling angle at 1.5 micrometers wavelength for a binary grating with a pitch of 895 nm.

FIG. 20A. Set up for poling the phase matched regions, including signal generator for applying voltage, high voltage amplifier, and oscilloscope for monitoring.

FIG. 20B. Microscope for viewing the sample.

FIG. 20C. Contacting configuration for connecting the set up to the sample.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

1. Introduction

Figure 1A:
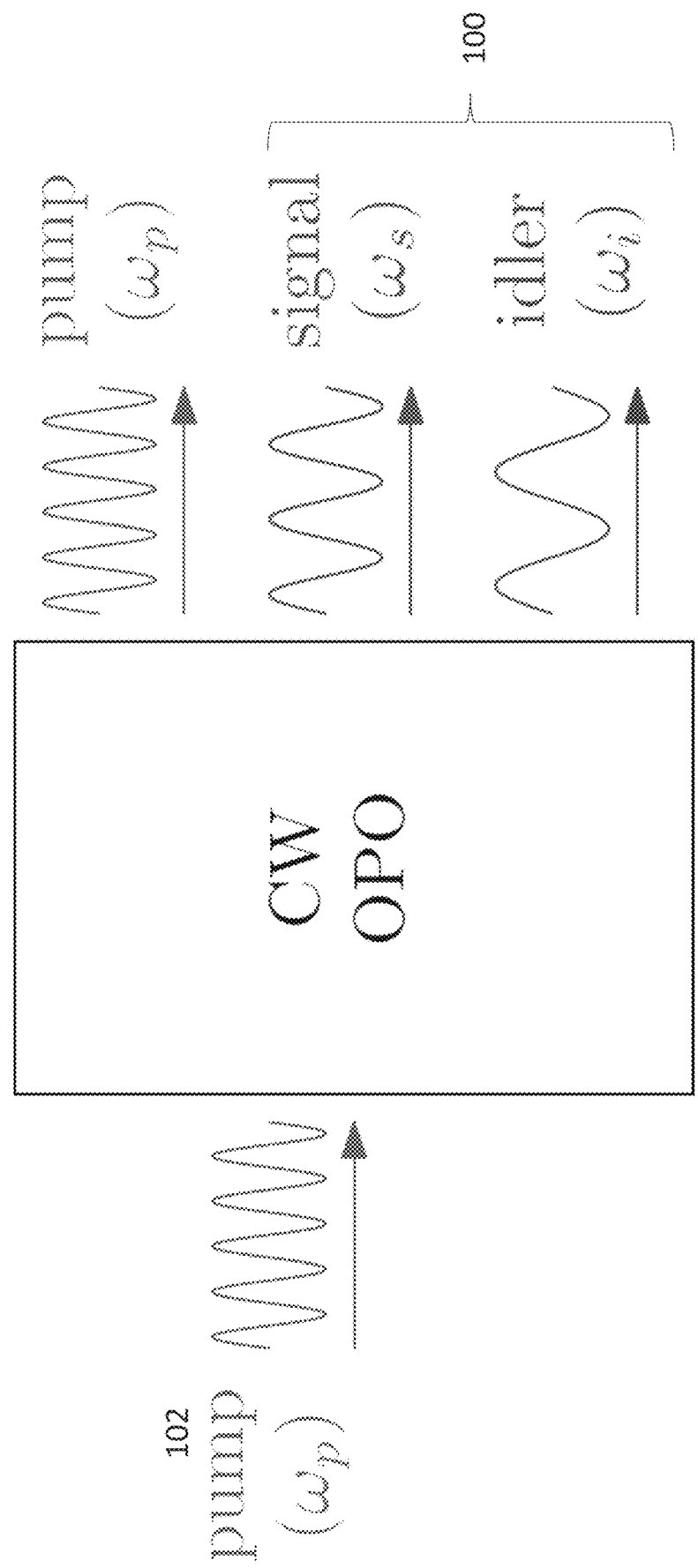
Figure 1B:
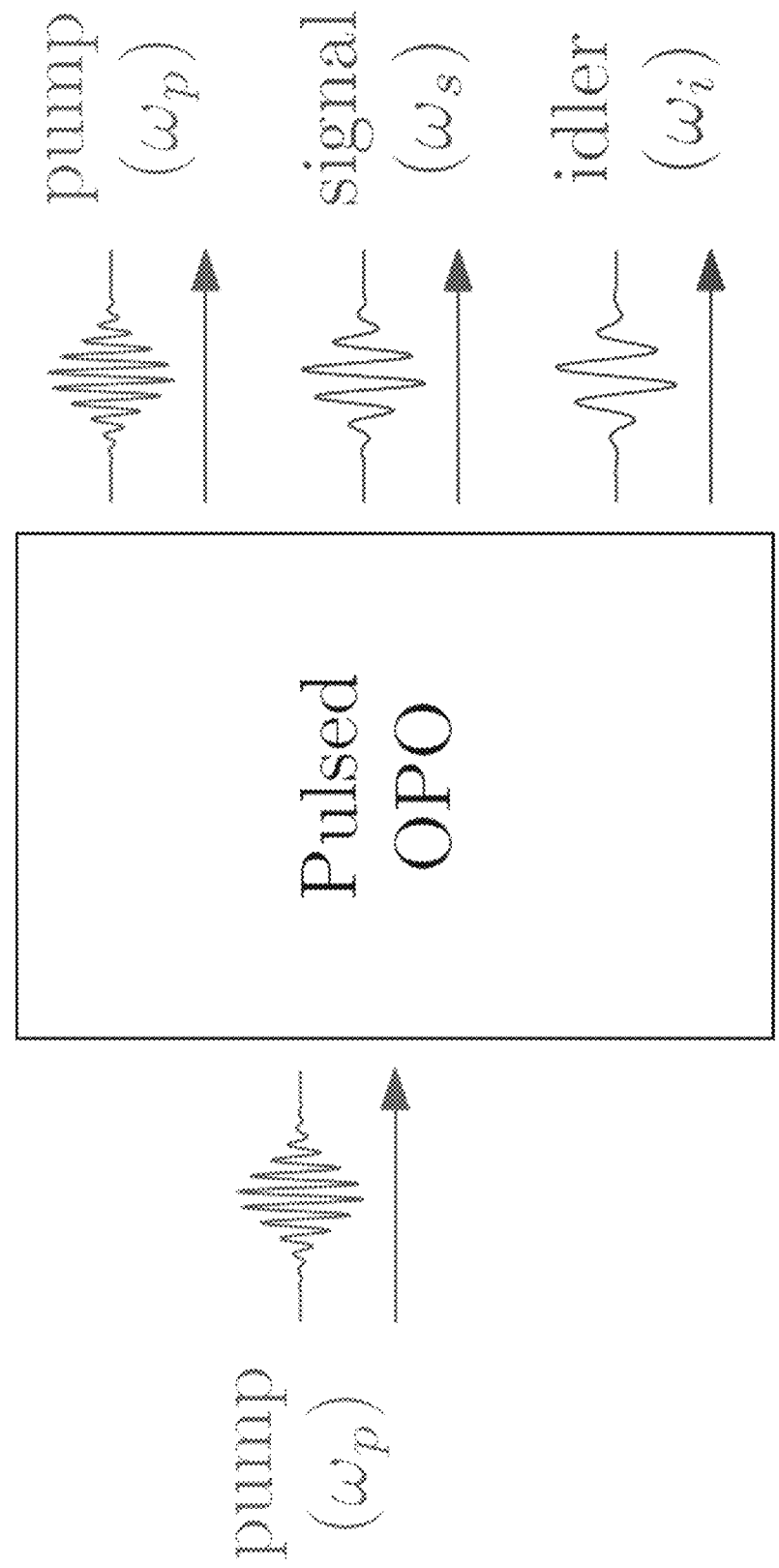

Optical parametric oscillators (OPO) convert an input optical wave, known as a pump 100, at frequency $\omega_p$, into two waves 102 at frequencies $\omega_s$ and $\omega_i$, known as the signal and idler. Conservation of energy gives the relationship between these three frequencies as $\omega_p = \omega_s + \omega_i$. Block diagrams representing OPOs are shown in FIGS. 1A-1C.

The operation of an OPO is similar to that of a laser in which there is a resonator that provides a feedback loop for the desired signal and a gain medium that amplifies it. In the case of OPOs, gain results from the generation and interaction of the three frequencies in a crystal having a second order nonlinear coefficient ($\chi^{(2)}$). The level of nonlinear interaction depends on the intensity of the pump 100 wave, and there is a threshold for the pump intensity above which oscillation occurs.

With the three signals involved, there are a variety of OPO configurations possible. When the signal and idler have the same frequency ($\omega_i = \omega_s = \omega_p/2$) the OPO is known as degenerate, and otherwise it is known as non-degenerate. In both cases, it is possible to design the OPO as singly resonant so that only the signal or the idler resonate, or as doubly resonant in which case both the signal and idler resonate, or even as triply resonant in which case the pump also resonates. OPOs can be operated with continuous wave signals, as shown schematically in FIG. 1A; however, because the nonlinear gain depends on the pump intensity, a pulsed pump wave can lead to lower threshold levels since pulsed signals can have large peak intensities compared to their average power, as shown in FIG. 1B.

Figure 1C:
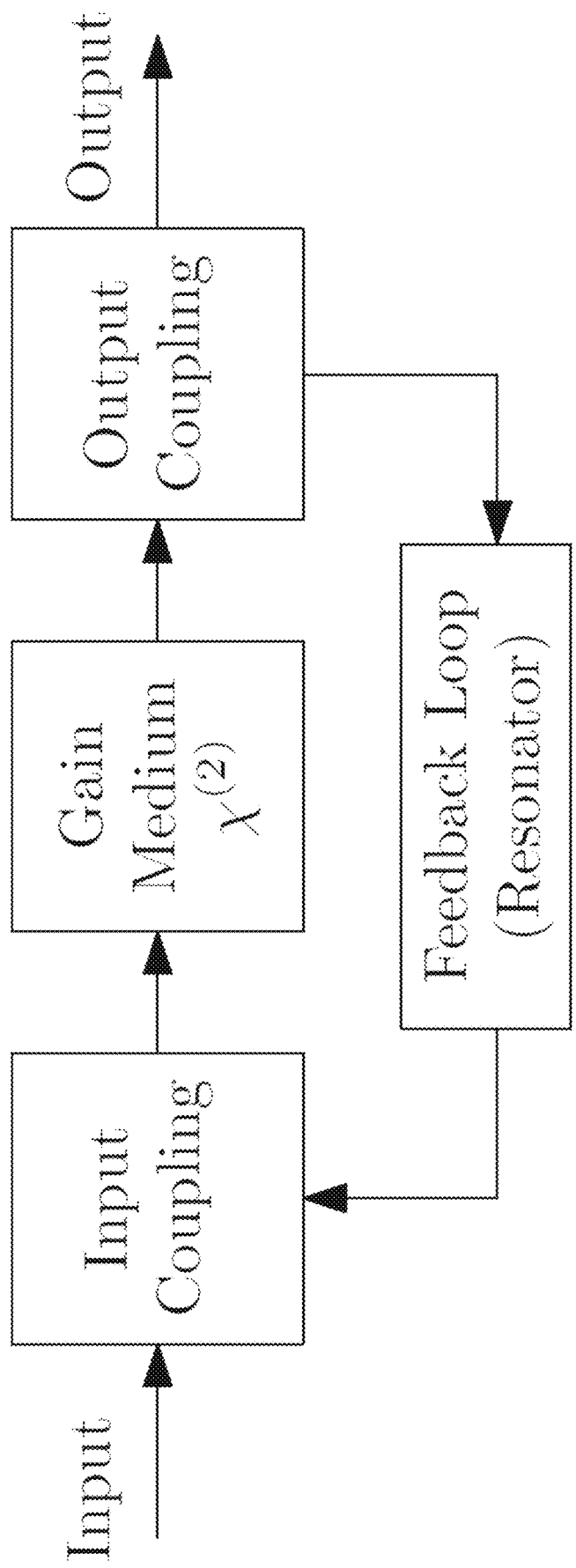

The main components of an OPO are shown in FIG. 1C. An input coupling device admits the pump wave into the OPO. The nonlinear gain medium produces the parametric generation and amplification of the signal and idler waves. An output coupler retains a fraction of the resonating wave(s) inside the OPO while transmitting a fraction of the waves(s). Finally, a composite resonator formed by the input and output couplers and gain medium creates feedback and leads to amplification of the wave(s).

2. Thin-Film Technologies

Figure 2A:
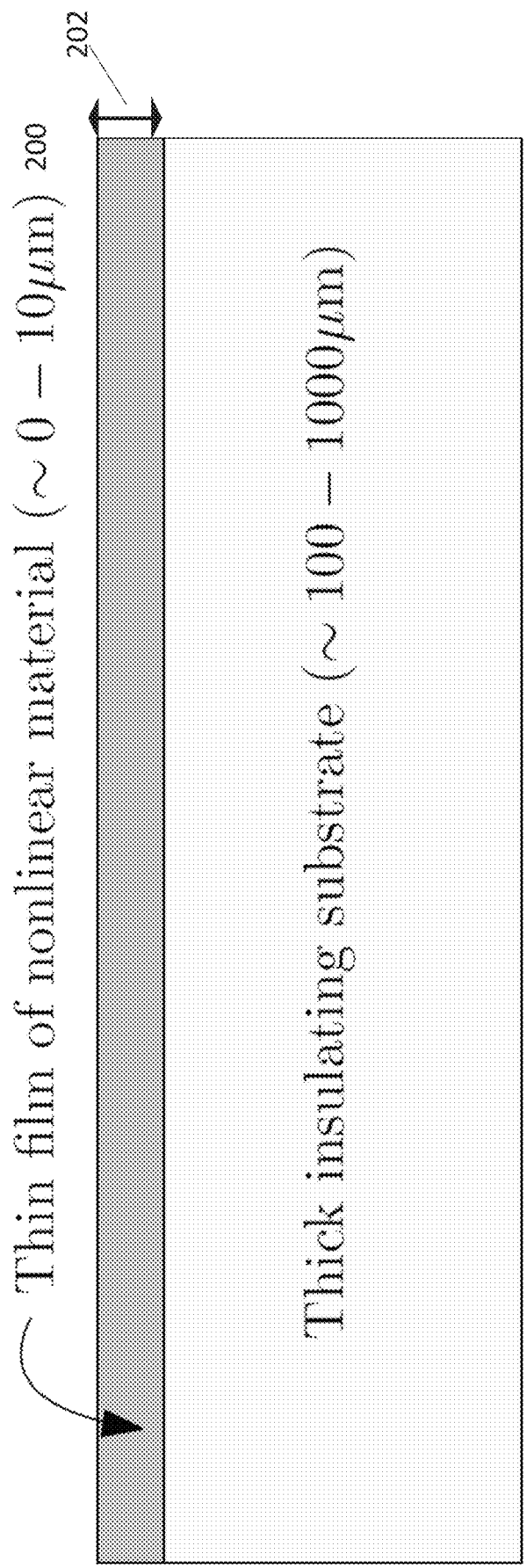
Figure 2B:
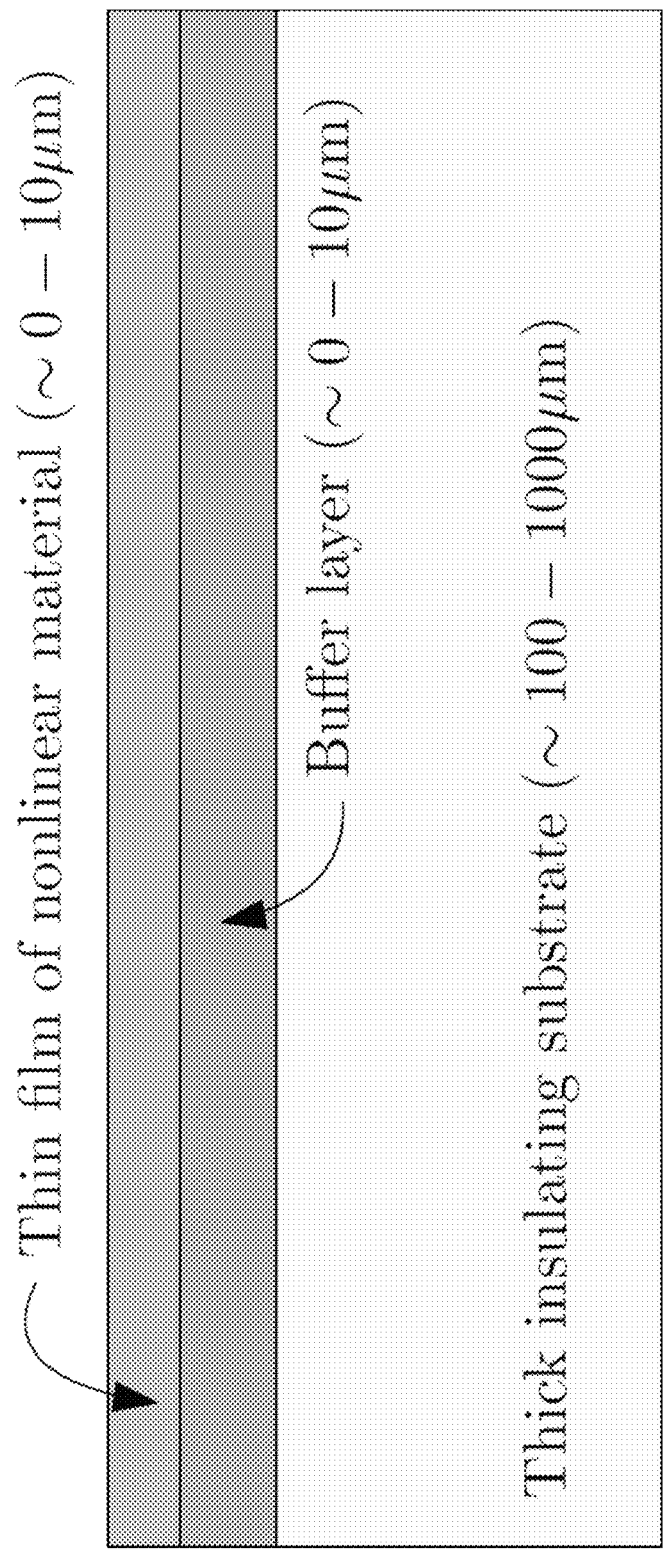

In various examples, "thin-film" refers to a layer 200 of a material on top of a substrate (for example an insulating material, with or without a buffer layer), wherein the layer of material has a thickness 202 on the order of 0.1-10 µm, as shown schematically in FIGS. 2A-2B. Examples of materials that can be realized in thin-film form and have a strong-second order optical nonlinear factor, $\chi^{(2)}$, include the ferroelectrics lithium niobate ($LiNbO_3$), potassium niobate ($KNbO_3$), lithium tantalate ($LiTaO_3$) and potassium titanyl phosphate (KTP), as well as non-ferroelectric semiconductors such as gallium arsenide (GaAs), gallium phosphide (GaP), and gallium nitride (GaN). For the substrate and buffer layers, bulk insulating materials with low optical loss can be used. Some examples are silicon oxide ($SiO_2$), sapphire ($Al_2O_3$), and silicon carbide (SiC).

Figure 3A:
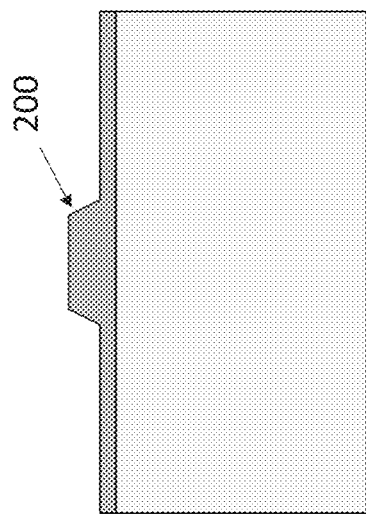
Figure 3B:
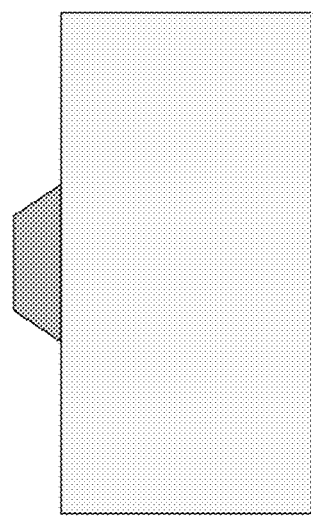
Figure 3C:
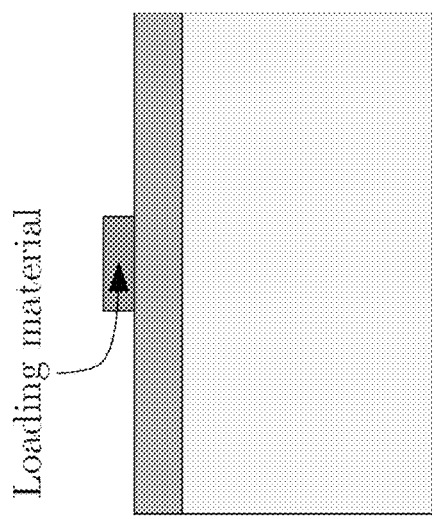

Some of the waveguide geometries that can be used as the building block of thin-film OPOs are shown in FIGS. 3A-3C. Examples of such waveguide geometries are demonstrated in different material platforms, including $LiNbO_3$ [1, 2], GaAs [3, 4], GaSb [5], as well as silicon-based structures evanescently coupled to a nonlinear media [6].

Figure 4:
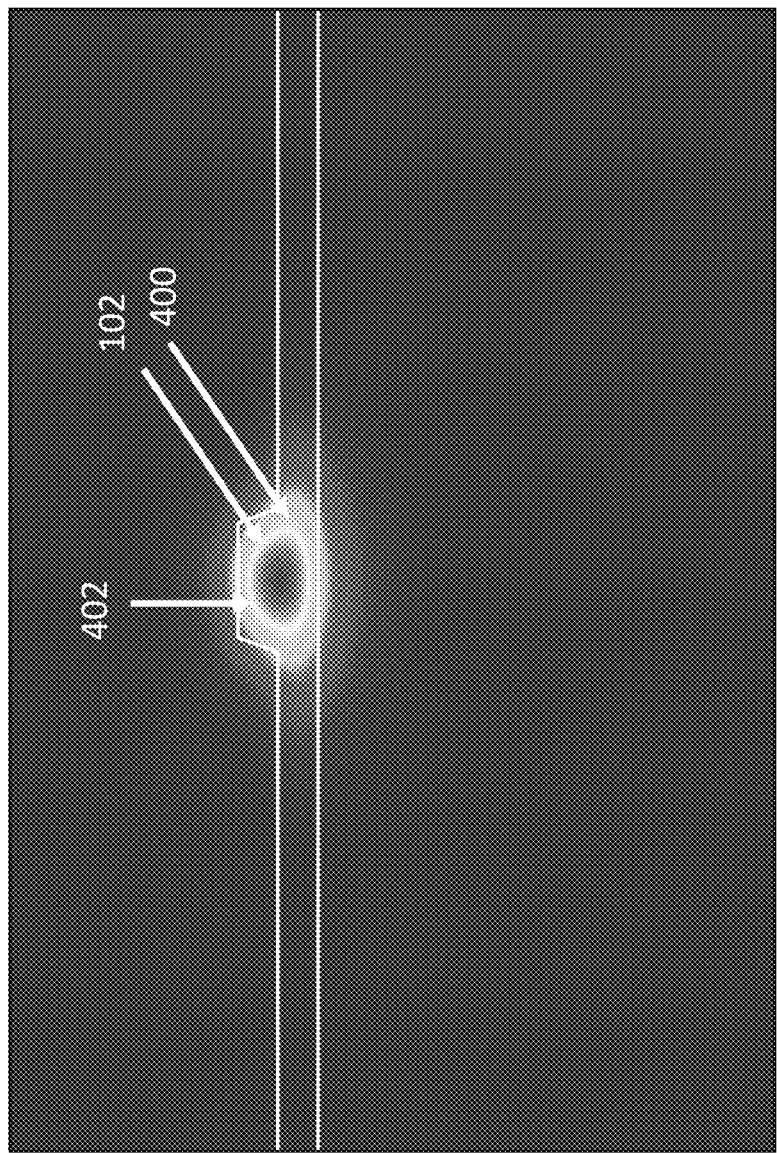
FIG. 4: Calculated profile of the fundamental TE mode supported by a lithium niobate ridge waveguide on top of $SiO_2$ substrate, according to one or more examples described herein.

As an example, FIG. 4 shows the electric field intensity of the fundamental transverse-electric (TE) guided mode for a ridge waveguide patterned in a lithium niobate thin-film bonded to a silicon oxide substrate. The key feature is the level of field confinement inside the waveguide. This leads to high field intensities that enhance nonlinear phenomena, allows the routing of waveguides close to one other with minimal coupling, and supports low-loss bends. This represents the main advantage compared with previous diffused waveguide technologies, in which the mode area is an order of magnitude larger [7].

Thus, FIGS. 1-4 illustrate an optical parametric oscillator (OPO), comprising a thin film waveguide 200 including a material having a second order nonlinear susceptibility $\chi^{(2)}$ generating an output electromagnetic field 102 in response to pump electromagnetic radiation or field 100 inputted into the thin film waveguide 200, the output electromagnetic field having a first wavelength or first set of wavelengths longer than a second wavelength or second set of wavelengths of the pump electromagnetic radiation or field and the thin film waveguide having a thickness 202 on the order of the first wavelength in the thin film waveguide so as to waveguide the output electromagnetic field along the thin film waveguide. FIG. 4 illustrates an example wherein the thickness 202 of the thin film 200 is less than 5 micrometers so as to guide a mode associated 400 with the output electromagnetic field 102 with most of its energy (at least 90%) confined in an area 402 smaller than 5 micrometers by 5 micrometers.

3. Phase Matching in Thin films

The efficient operation of OPOs requires that the pump, the signal, and the idler, have similar phase velocities. This condition is generally not met in thin-film waveguides due to wavelength dispersion. Different approaches have been conceived to address this issue and are collectively known as phase matching techniques. One of these, readily applicable to thin film technologies, is "quasi-phase-matching."

In quasi-phase-matching, the nonlinear properties of the material are spatially modulated, which introduces the additional momentum necessary for monotonic energy conversion from the pump to the signal wave. This method allows all waves to propagate co-linearly and with the same polarization, permitting the use of the largest nonlinear tensor coefficient of the material and thereby increasing the energy conversion efficiency.

Quasi-phase-matching can be achieved in several ways. Techniques that can be applied to thin-films include:

Periodic poling of ferroelectric materials: This can be achieved by applying a high electric field in a periodic pattern to an area of the thin-film in order to induce alternating ferroelectric domains. This is done as part of the fabrication and processing of the integrated chip [8].

Orientation patterning of semiconductor films: In this case, the semiconductor thin-film is grown from a seeded pattern with periodic crystal reversals [9]. This technique is more complex than periodic poling but allows the phase matching of important semiconductor materials like GaAs and GaP that are not ferroelectric.

Direct laser processing: There have been efforts to either produce a laser-induced periodic domain reversal [10] or to selectively reduce the nonlinear coefficient with a femtosecond laser [11].

4. Tuning Elements

Tuning certain OPO parameters enables broader functionality for a wide range of applications. In some cases this is necessary to achieve agile systems, for instance, in the generation of tunable sources. In other cases, tunability allows particular regimes of operation, for instance in pulsed applications where fine tuning of the effective resonator length leads to control of the repetition period. In table-top systems, tuning is obtained by using piezoelectric actuators to change the physical location of components such as mirrors. It is also possible to adjust the temperature of the nonlinear gain medium, or to apply a DC voltage to it, in order to influence its polarization moment.

Figure 5A:
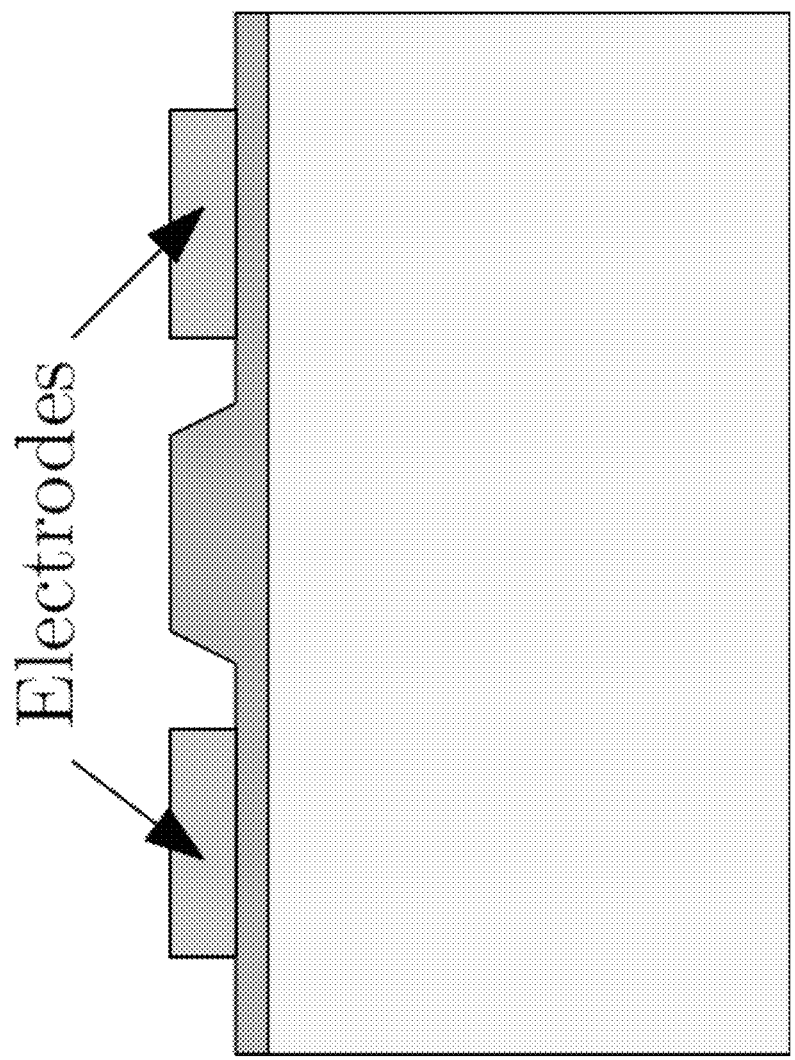
Figure 5B:
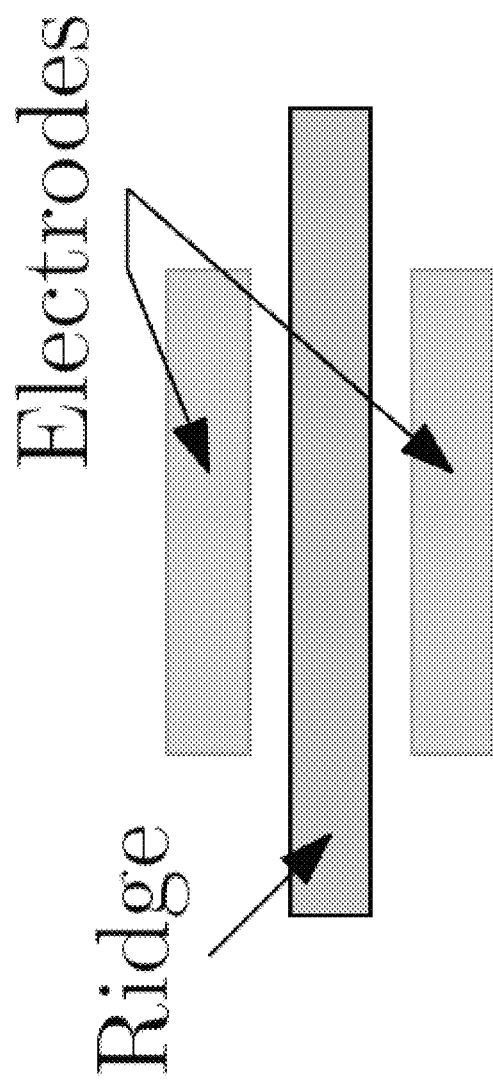

In one or more embodiments of the invention, we implement tunable elements that enable tuning capabilities similar to those obtained in table-top implementations, but in an on-chip configuration. These mechanisms include:

Electro-optic effect (Pockels effect): It is possible to change the effective refractive index, and thereby the propagation velocity and effective optical length, of a section of photonic waveguide by the application of an electric field, For this purpose, a pair of electrodes can be deposited alongside a waveguide, as shown in FIGS. 5A-5B. The Pockets effect is typically extremely fast and therefore can be used to modulate the refractive index up to microwave frequencies [12].

Thermoelectric effect: Alternatively, the characteristics of a photonic waveguide can be modified using temperature. This can be achieved locally in a different number of ways: for instance, a voltage can be applied across an resistive element patterned nearby, or a nearby diode can be biased at different levels.

Piezoelectric effect: In some materials, including lithium niobate, the piezoelectric effect can be used to change the physical dimensions of portions of a waveguide structure by applying appropriate electrical signals. This includes inducing acoustic waves within the structure to realize acousto-optic modulation and/or filtering.

5. On-Chip OPO Examples

In this section we present a possible implementations of on-chip OPOs wherein a resonator 600, 700 is coupled to and/or includes the thin film waveguide 200.

5.1. Example 1: Partial Racetrack Resonator

Figure 6:
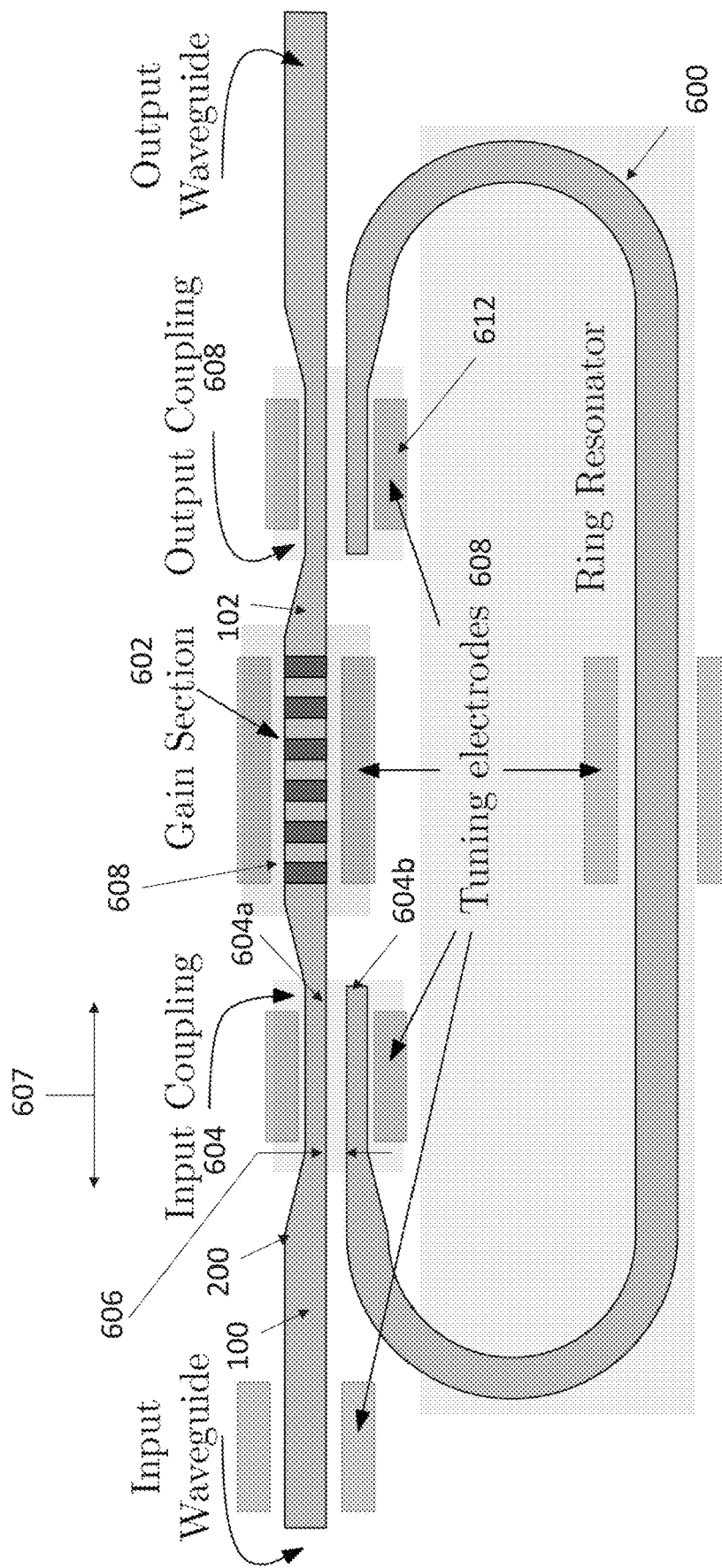
FIG. 6: On-chip OPO with partial racetrack resonator and frequency selective couplers, according to one or more examples described herein. The tuning electrodes can be used to tune the effective length of the resonator, the wavelength dependence of the couplers, and the phase matching wavelength of the gain section.

The first example, shown schematically in FIG. 6, comprises a partial ring resonator 600, a parametric gain section 602, and a pair of wavelength sensitive couplers 604, 606 capable of coupling different spectral contents of the electromagnetic field 102 or the pump electromagnetic radiation or field 100 into and out of the resonator. The couplers 604, 606 are directional couplers and their wavelength selectivity is tuned by the gap size 606 between two waveguides or waveguide sections 604a, 604b of the directional couplers 604 (i.e., between the thin film waveguide 200 and the resonator 600). In one or more examples, the resonator only supports resonances for the output electromagnetic field by setting the length 607 of the directional couplers long enough, taking into account the first wavelength or first set of wavelengths of the output electromagnetic field have a wider mode that couples differently into the resonator than the input (pump) electromagnetic radiation or field.

The output wavelength selective coupler 606 is configured to route different spectral portions of the output electromagnetic field 102 to different outputs from the thin film waveguide 200.

The OPO further comprises an actuator 608 coupled to the thin film waveguide 200, the couplers 604, 606, or parts of the resonator 600, wherein the actuator 608 can tune some of the operation behaviors of the OPO, for instance the first wavelength or a subset of the first set of wavelengths (for instance by changing the refractive index of a portion of the thin film waveguide 200 or the resonator 600).

The thin film waveguide and/or the resonator includes a phase matched section 608 of the gain section 602 that is phase matched for the nonlinear interactions between the input (pump) electromagnetic radiation or field 100 and the electromagnetic field 102, so as to achieve parametric gain of the electromagnetic field 102 in the thin film waveguide 200 and/or the resonator 600.

In the gain section 602, the pump wave 100 with a frequency $\omega_p$ is converted to a pair of waves 102, the signal and the idler, with frequencies $\omega_s$ and $\omega_i$, respectively.

Also shown are input waveguide 612 and output waveguide 614.

The difference between the signal and idler, and the design of the frequency selective couplers, can lead to a several variations, including:

Doubly resonant OPO: In this case, the couplers are designed to be transparent to the pump wave and couple a predetermined fraction of the signal and idler into the resonator. The fractions of the signal and idler that do not couple to the resonator leave the OPO and become the desired output. This OPO can be degenerate or non-degenerate.

Non-degenerate OPO, singly resonant: When the signal and idler waves have different frequencies, it is possible to design the couplers to approximately couple only the signal into the resonator while rejecting the idler.

Triply resonant OPO: It is also possible to design the couplers so that all three waves resonate, although achieving this mode of operation with a single resonator may be challenging. This OPO can be degenerate or non-degenerate.

5.2. Example 2: Linear Resonator

Figure 7:
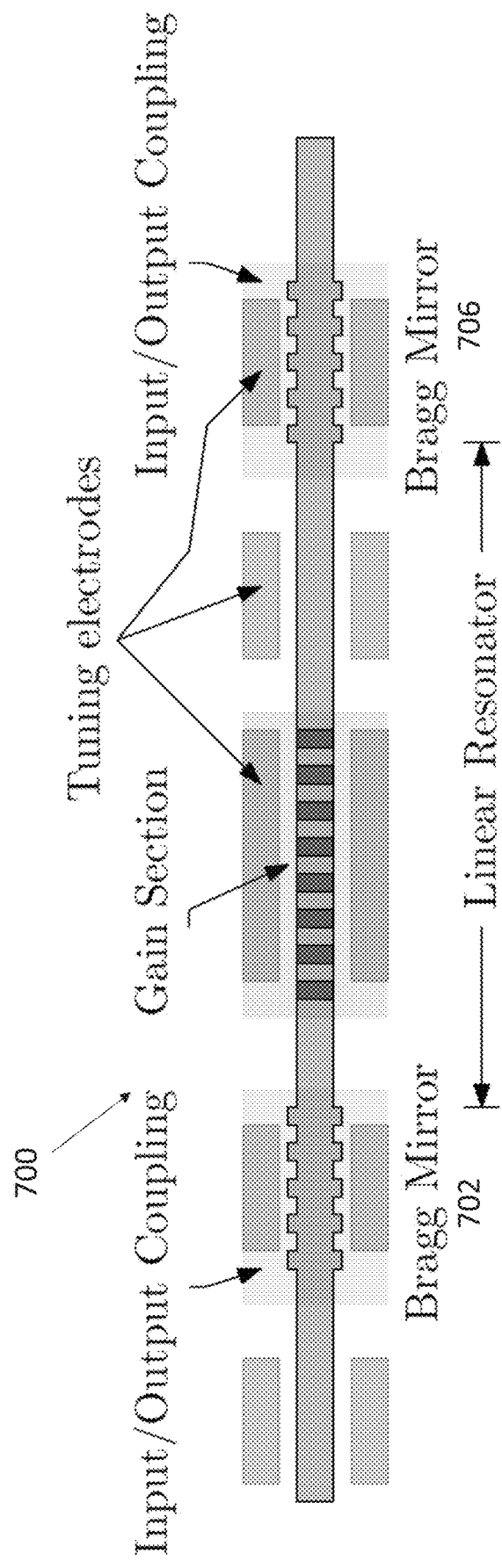
FIG. 7: On-chip OPO where the gain section is within a geometrically linear resonator formed using Bragg reflectors, according to one or more examples described herein. Tuning electrodes can be included to adjust the frequency response of the OPO.

It is also possible to have the OPO gain section within a geometrically linear resonator or cavity 700 surrounded by (e.g., on-chip) mirrors 702, 704, such as Bragg reflectors, as shown in FIG. 7. The mirrors also act as the input and output couplers and can be designed to be wavelength selective, enabling the same functionalities as the couplers used for the racetrack OPO in Example 1. For instance, for a doubly resonant OPO, the output mirror can be transparent to the pump while partially reflective to the signal and idler. Another possibility in this case is the use of several mirrors in order to realize unique resonator lengths for the signal, idler, and/or pump.

5.3. Example 3: Racetrack OPO

Figure 8:
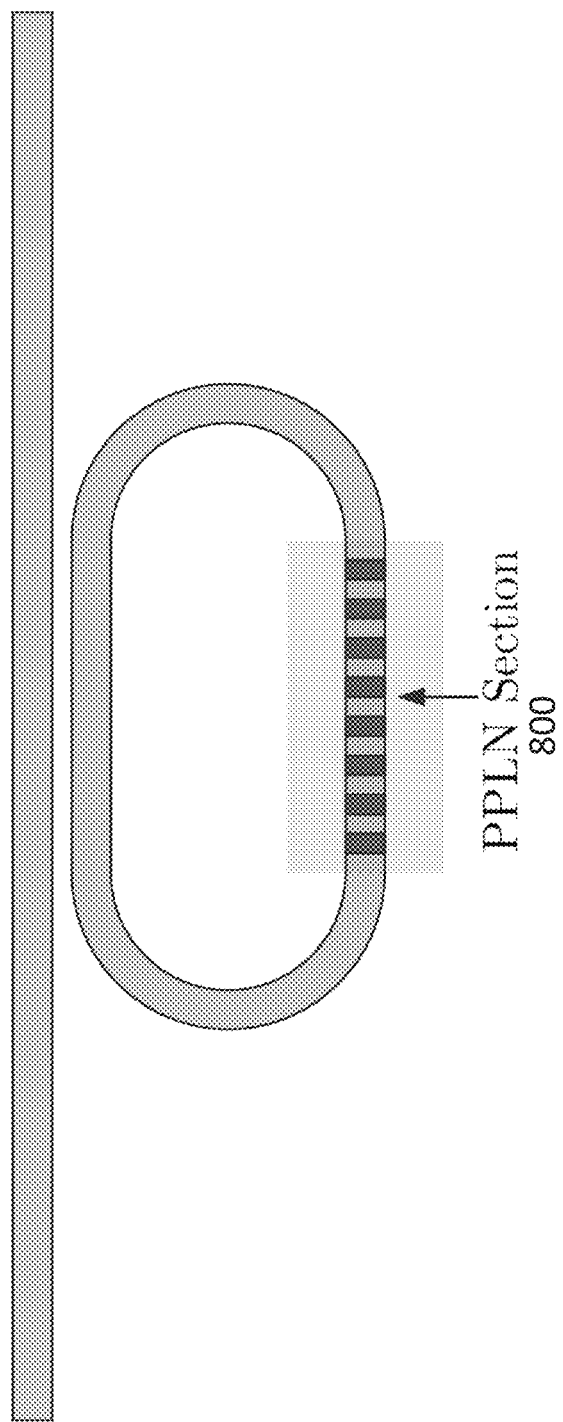
FIG. 8: On-chip OPO where the gain section is within a racetrack resonator, according to one or more examples described herein. Tuning electrodes have been omitted.

FIG. 8 shows an OPO in which the gain section 800 is located inside a racetrack resonator that is coupled to an input/output waveguide. In one example, the layout is similar to a micro resonator frequency comb generators that are based on the Kerr nonlinearity. the OPO case, the interaction of three different waves makes this a triply resonant OPO unless a technique is implemented to completely suppress circulation of the pump wave in the resonator. As in the previous examples, tuning electrodes can be included as well as multiple wavelength- selective input/output couplers.

6. Simulation Results

In this section, we illustrate embodiments of the present invention by computer simulation. We consider the case of a thin-film of lithium niobate on top of a thick sapphire substrate.

6.1. Dispersion Engineering Using the Waveguide Geometry

Figure 9:
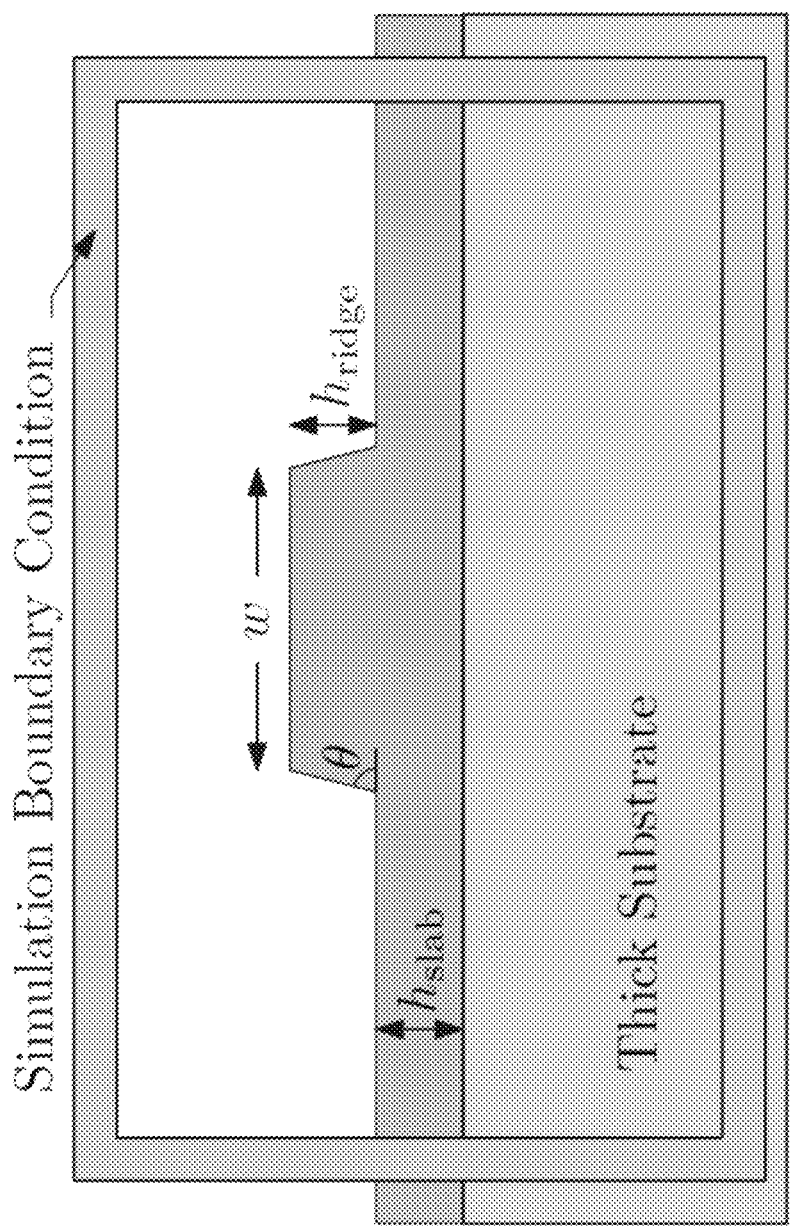
FIG. 9: Waveguide geometry and simulation setup used for dispersion engineering and analysis, according to one or more examples described herein.
Figure 10:
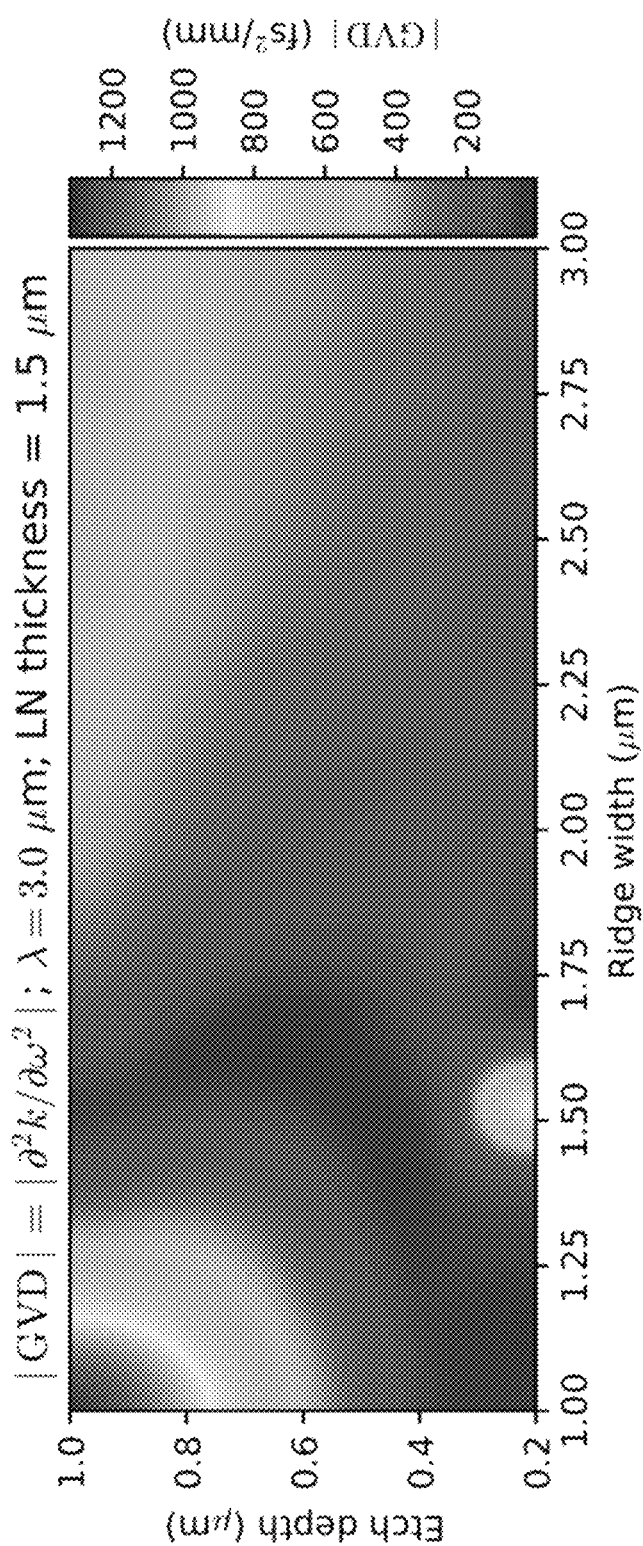
FIG. 10: Magnitude of the group velocity dispersion (GVD) at $\lambda=3$ μm, for different values of ridge width (w) and etch depth ($h_{ridge}$).

We consider here a ridge waveguide with the parameters shown in FIG. 9. An important parameter for OPO optimization is group velocity dispersion (GVD). For a given lithium niobate thickness, it is possible to choose values of ridge width, sidewall angle, and etching depth to obtain desired values of GVD. Calculations with fixed sidewall angle and varying ridge width and etching depth are shown in FIG. 10. Minimum GVD can be identified from these results.

6.2. Waveguide Couplers

Figure 11A:
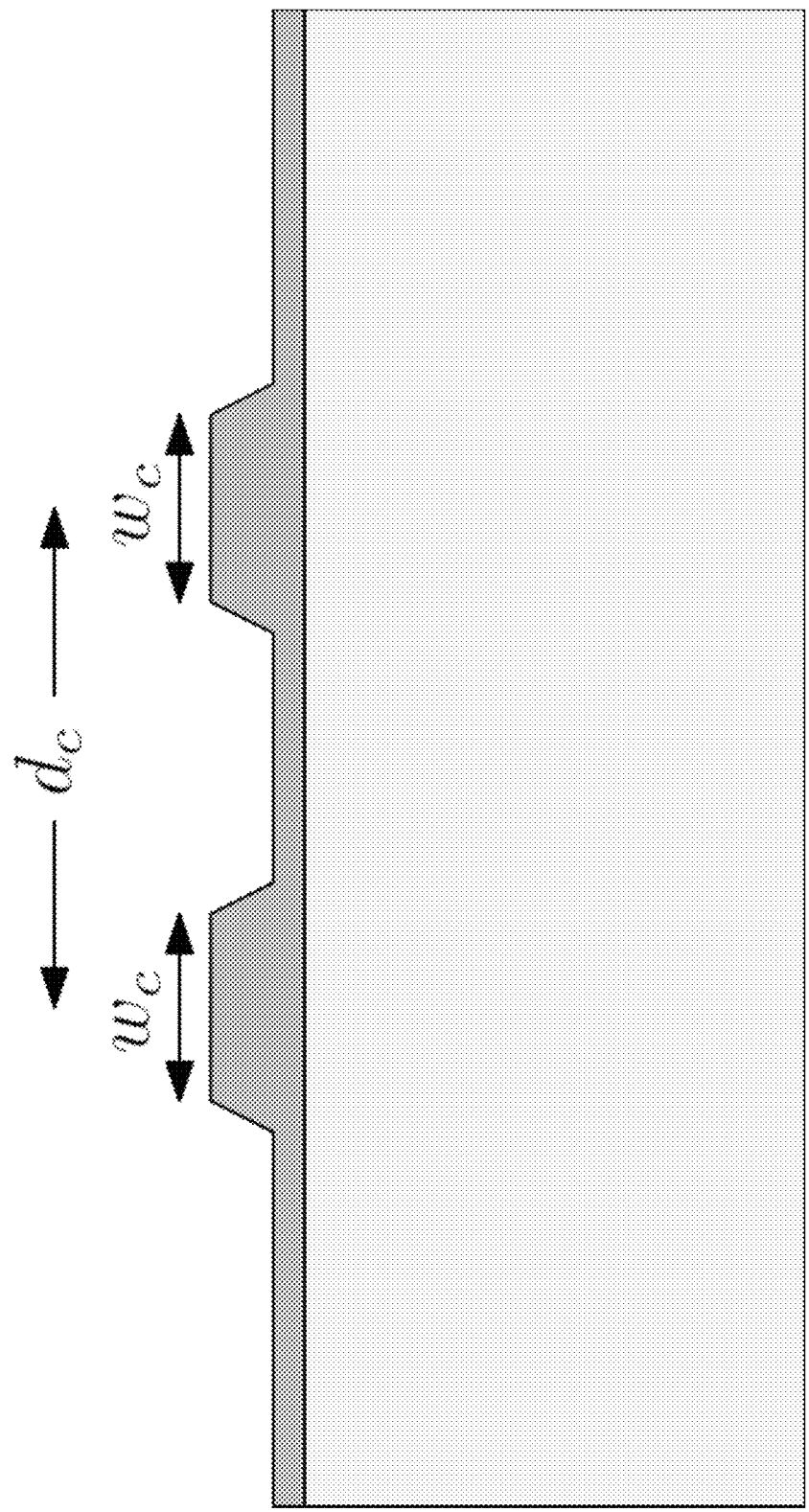
Figure 11B:
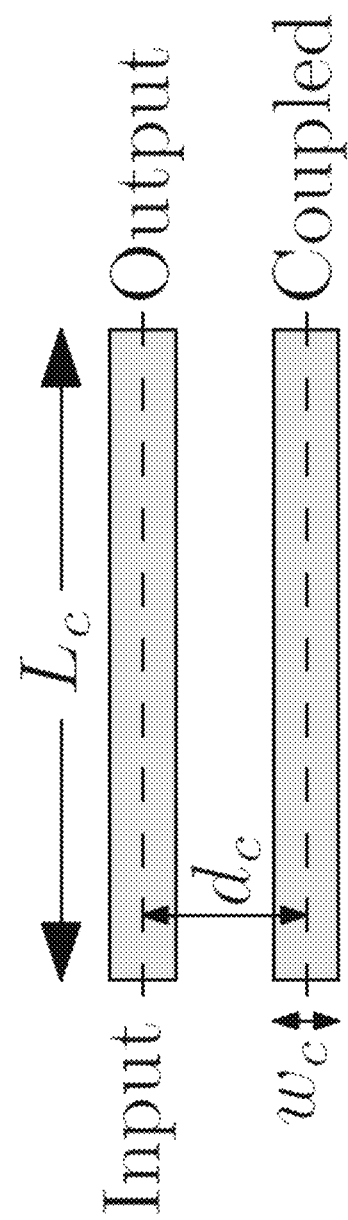

It is necessary to select which wavelengths will resonate within the OPO and which will be completely coupled out. We consider the example topology shown in FIG. 6, and the coupler geometry shown in FIGS. 11A-11B.

Figure 12A:
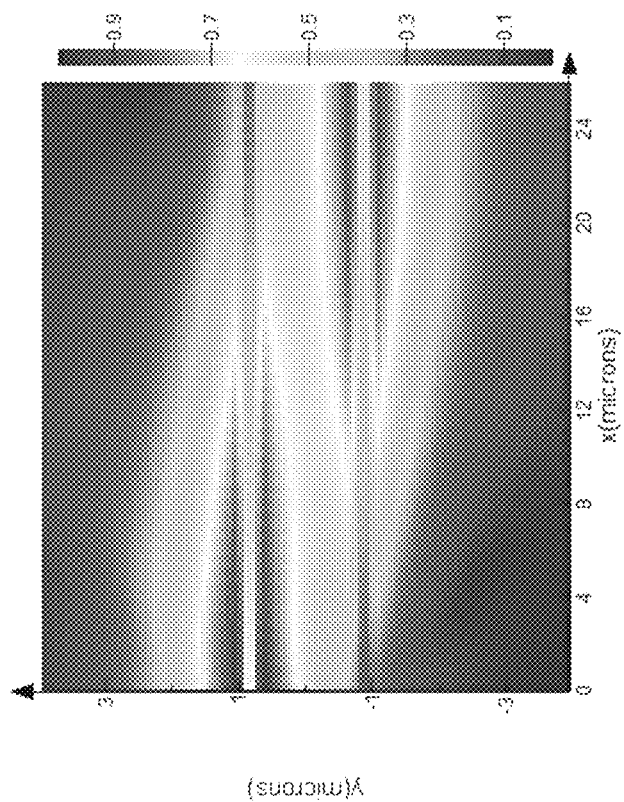
Figure 12B:
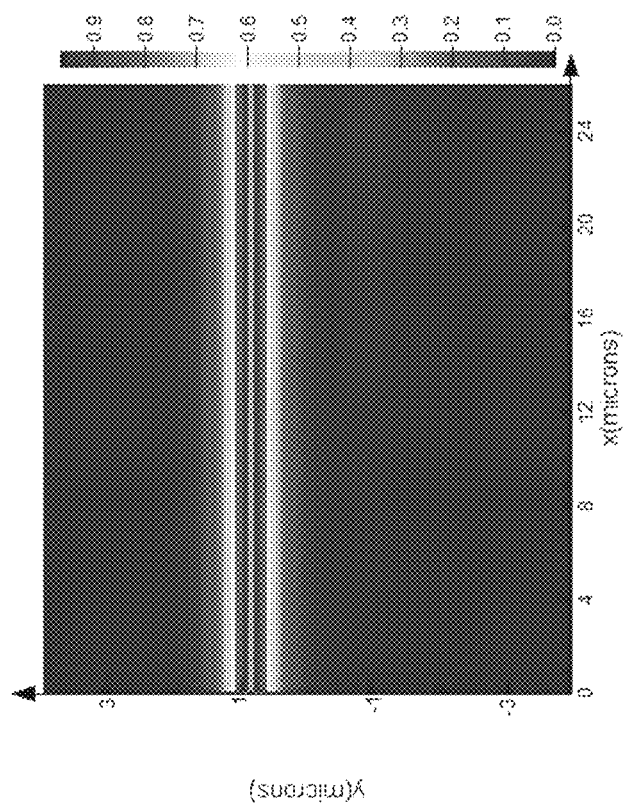

Depending on the type of OPO to be designed, the coupler will have different requirements. For instance, in the following two examples the required coupling behavior versus wavelength is distinct:

Doubly resonant, degenerate OPO. In this case, the pump wave should be transmitted through the output coupler, while the signal and idler should be coupled into a resonator. Because longer wavelengths have, in general, larger mode areas, the coupling length necessary to achieve a given coupling factor is shorter for the signal and idler than for the pump. In other words, the fraction of energy coupled from the pump wave can be made relatively small even with a significant coupling factor for the signal and idler; this is illustrated in FIGS. 12A and 12B.

Figure 13A:
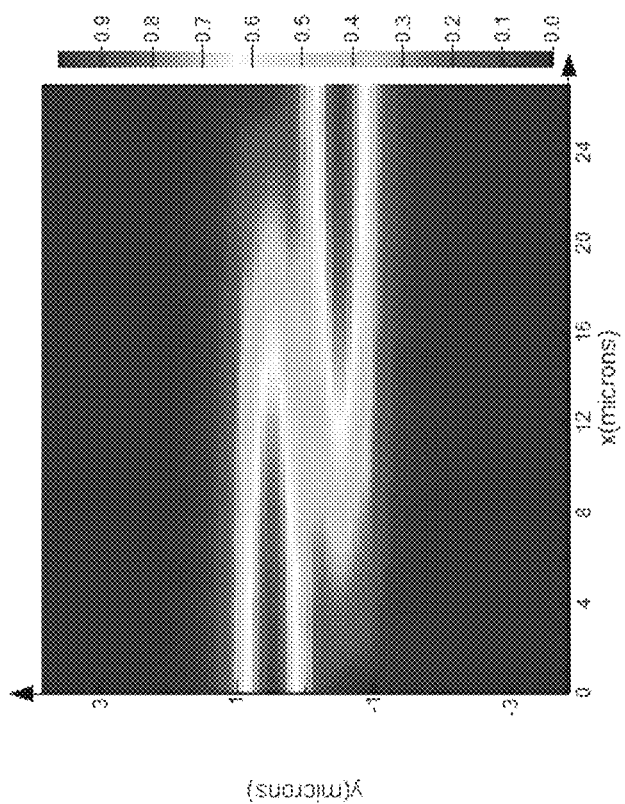
FIGS. 13A-13B: Example of a coupler for a singly resonant, nondegenerate OPO.
Figure 13B:
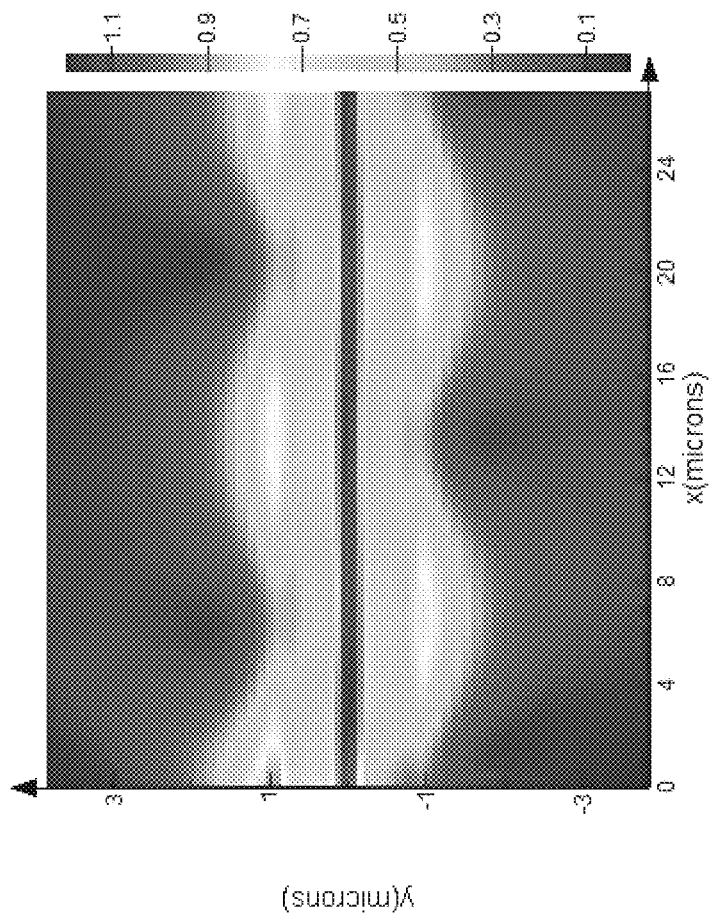

Singly resonant, non-degenerate OPO. In this case it may be desirable to retain the signal in the OPO resonator and let the idler pass through the output coupler (with $\omega_s > \omega_i$). This requires a coupler with the opposite behavior as the previous example, since now it is the shorter wavelength that must be coupled into the resonator. This can be achieved by coupling the longer wavelength back and forth between the waveguides while ensuring that most of the energy remains in the through port. An example of this technique is shown in FIGS. 13A and 13B.

7. Example Experimental Realization a. Example Waveguide, Couplers, and Resonator In order to develop a process for fabricating LNOI waveguides, we first developed an electron-beam patterning and plasma etching process using less-expensive bulk lithium niobate ($LiNbO_3$) samples as test pieces. We employed a silicon nitride ($SiN_x$) hard mask process to define etched features, and we developed a high-bias $Ar/BCl_3$-based plasma etching process using the JPL Microdevices Laboratory cleanroom facilities. The hard mask layer was deposited on clean $LiNbO_3$ substrates using high-density plasma-enhanced chemical vapor deposition at a process temperature 150° C., which enables the deposition of dense, low-stress $SiN_x$ films to thicknesses exceeding 1 µm. The samples were then spin coated with ZEP520A electron-beam resist and then coated with 20 nm of Cr metal as an anti-charging layer. The patterns were exposed on a Raith 5000+Electron Beam Pattern Generator system, using a 100 keV electron beam energy, two-pass exposure, and proximity effect correction with a nominal dose of 70 µC/cm². After removing the Cr layer, the exposed resist was developed in ZED-N50 solvent-based developer, and the patterns were transferred into the $SiN_x$ hard mask using a $SF_6/C_4F_8$ anisotropic plasma etching process. After removing residual resist, the samples were then etched in the high-bias $Ar/BCl_3$ process, and residual hard mask material was removed using $SF_6$ plasma etching. Finally, the samples were cleaned in a heated solution of $NH_4OH$ and $H_2O_2$, in order to remove unwanted redeposited material accumulated on the sidewalls of the etched structures from the high-bias plasma etch.

Figure 15A:
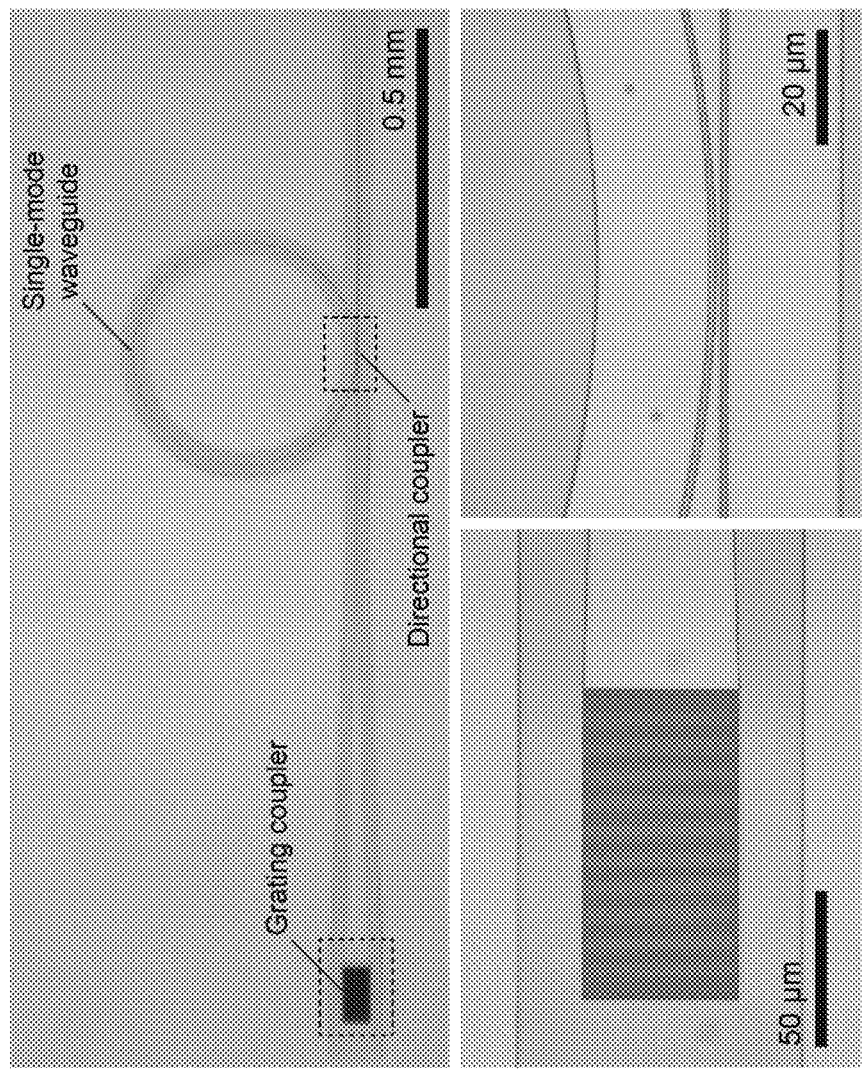
FIGS. 15A-15D. Optical (FIG. 15A) and electron microscope (FIGS. 15B-15D) images of a fabricated LNOI waveguide device, showing a bus waveguide with grating couplers for free-space input/output and an evanescently coupled ring resonator.
Figure 15C:
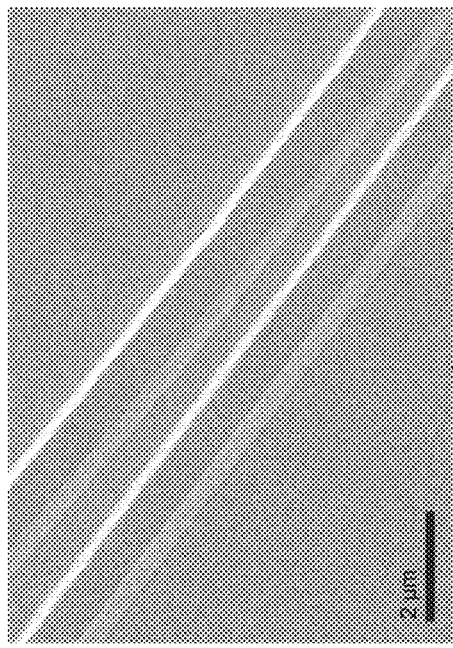
Figure 15D:
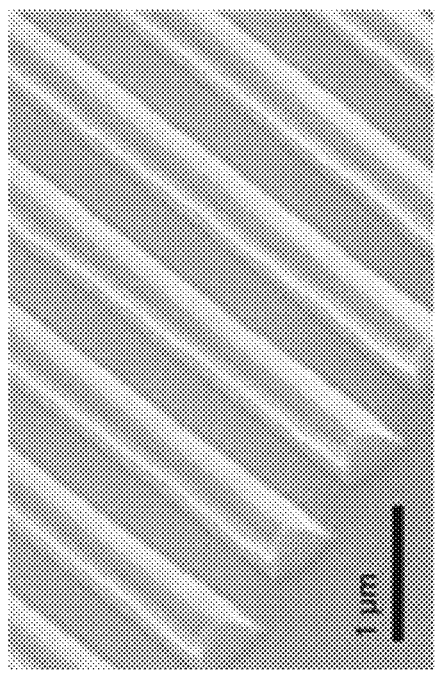
Figure 15B:
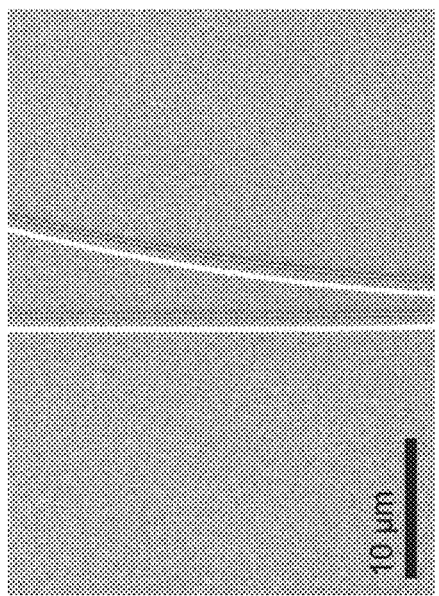

After optimizing the patterning process, we fabricated grating-coupled waveguides and ring resonators in thin-film LNOI samples. The unpatterned LNOI samples had a nominal thickness of 700 nm of MgO-doped $LiNbO_3$, with a 2-µm-thick $SiO_2$ buried oxide layer on a 500-µm-thick $LiNbO_3$ substrate. The crystal orientation of the $LiNbO_3$ thin film (and substrate) was x-cut normal to the sample surface. The waveguides were designed to support a single transverse-electric (TE-polarized) optical mode near 1.5 µm wavelength, and grating couplers were designed to facilitate coupling between the guided TE mode and free-space light at an angle of 10° relative to the sample surface. The waveguides and gratings were etched to a depth of approximately 250 nm into the LNOI thin film, with a nominal waveguide width of 1.2 µm. FIG. 14 shows a diagram of the waveguide devices as well as calculations of the ring resonator bending loss and grating coupler characteristics. Optical and electron microscope images of a fabricated LNOI device are shown in FIG. 15. FIGS. 15B-15C are electron micrographs showing a typical waveguide coupled to a resonator (FIG. 15B is a top-down view and FIG. 15C is at a 45 degree angle so you can see the height of the waveguide). FIG. 15D shows a grating coupler used to couple light to the waveguides.

Figure 16:
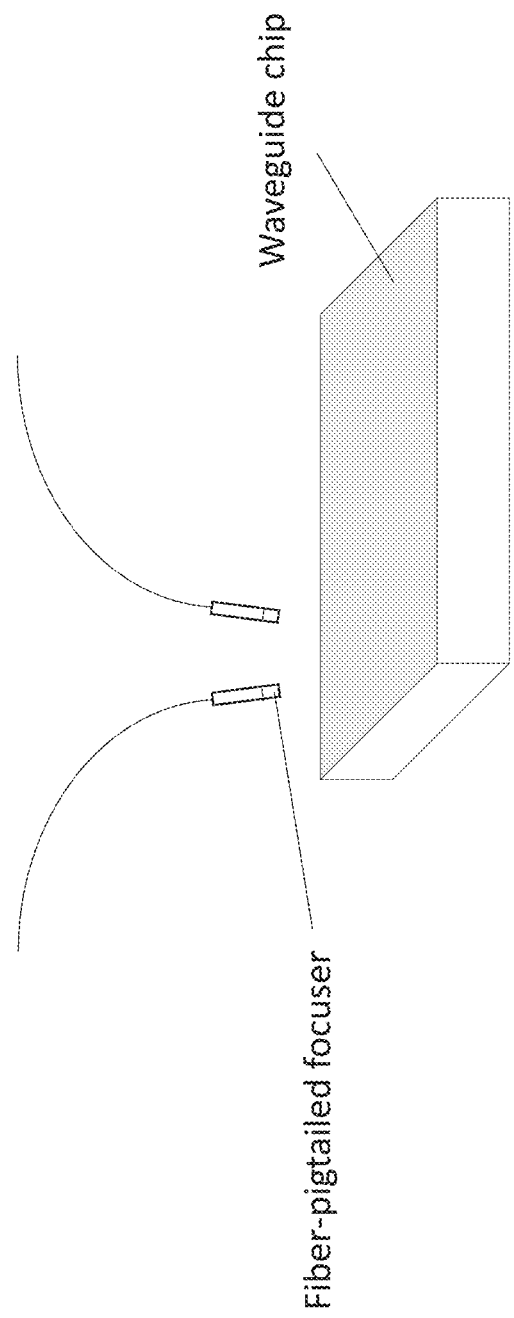
FIG. 16. Photograph of the custom-built waveguide testing setup in the Applicant's facilities used to characterize LNOI waveguide devices. The two identical fiber-pigtailed focusers are used to illuminate the input grating and extract light from the output grating of the device under testing. The waveguide chip stage and the focuser mounts are translated independently using computer controller micro positioners, which enables precise alignment.

Completed LNOI waveguide chips were characterized using a custom-built waveguide testing setup. Light from a broadly tunable fiber-coupled external-cavity laser (Santec TSL-710) was sent through a polarization controller and focused onto the waveguide input grating coupler using a custom-designed fiber-pigtailed focuser with a working distance of 12 mm and a spot size of 60 µm. Light was collected from the output grating using an identical fiber-pigtailed focuser and sent to a calibrated InGaAs optical power meter. A photograph of the waveguide testing setup is shown in FIG. 16. The waveguide chip pattern was designed with straight bus waveguide sections (parallel to the y-direction of the LiNbO$_3$ thin film) evanescently coupled to 200-µm-radius ring resonators with varying coupling gap. An edge-to-edge separation of 900 nm between the bus waveguide and ring resonator was found to result in nearly critical coupling with an on-resonance extinction of approximately 10 dB. By sweeping the laser wavelength, we measured the line shape of several resonances near 1.5 µm wavelength. From the separation between resonances (the free-spectral range) and the resonance linewidth, we calculated the waveguide group velocity and propagation loss.

Figure 17:
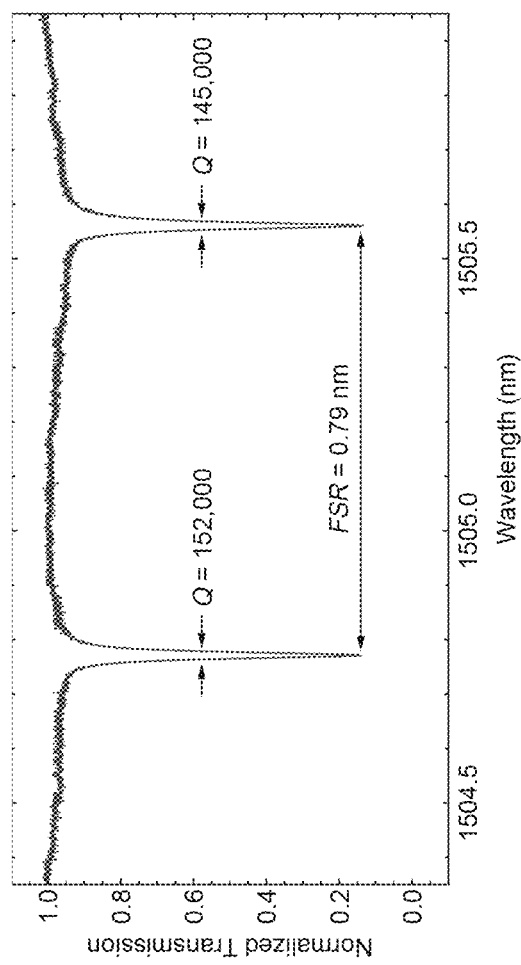
FIG. 17. High-resolution spectrum near 1505 nm wavelength showing the detailed line shapes of two resonances (right). The free spectral range (FSR) and the loaded quality factor (Q) are determined from these resonances and used to calculate the waveguide propagation loss.

For typical LNOI ring resonators with the geometry described above, we measured loaded quality factors of approximately 150,000, which corresponds to an intrinsic quality factor of 270,000 after accounting for loss due to the evanescently coupled bus waveguide (see FIG. 17).

Figure 18:
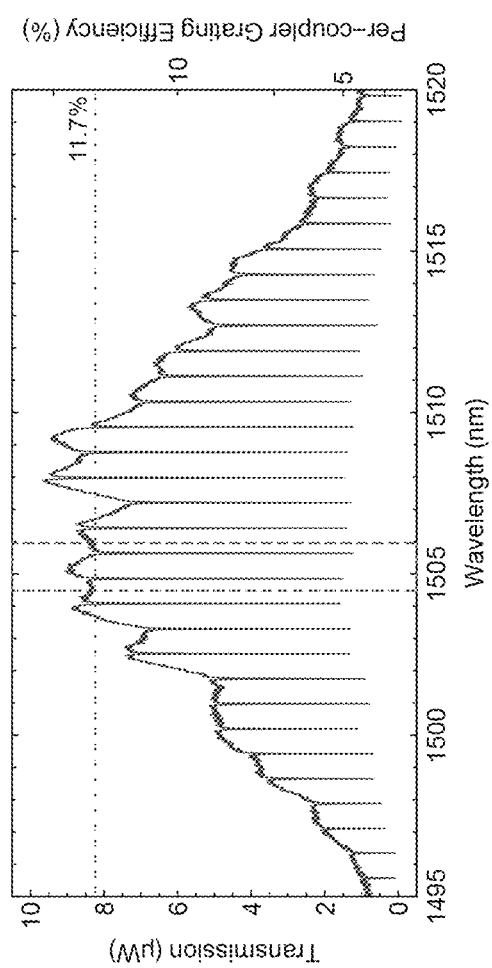
FIG. 18. Transmission spectrum measured through a grating-coupled bus waveguide evanescently coupled to a 200-µm-radius ring resonator.

With a group index of 2.3 extracted from the measured free-spectral range, this corresponds to loss of 1.5 dB/cm in the ring resonator. Calculations show that the bending losses for the fabricated geometry are below 0.01 dB/cm; therefore, nearly all of the loss can be attributed to scattering and absorption losses in the etched waveguide. FIG. 18 shows a typical transmission spectrum for one of the fabricated LNOI waveguide ring resonators.

Finally, we note that with 1 milliwatt (mW) of optical power output from the test laser, and an estimated 4 dB of loss through the fiber, polarization controller, and focusers, we observed a measured throughput of 10 µW with a bus waveguide length of approximately 2 mm. This corresponds to a grating coupling efficiency of 12% per grating. With a cavity finesse of ~80 (calculated as the ratio of the free-spectral range to the resonance linewidth), we therefore estimate a circulating power of 1 mW in the waveguide ring resonator. With a modal cross-sectional area below 1 µm$^2$, this implies a power density of more than 100 kW/cm$^2$ in the waveguide with only 1 mW of input laser power.

Lithium niobate has been a workhorse of the photonics industry for decades due to its wide spectral transparency window, low loss, and large second order nonlinear coefficient. However, traditional attempts to produce integrated waveguides in bulk wafers of LiNbO$_3$ have suffered from low optical confinement, which leads to large bending radii and relatively large components. Recent advances in layer transfer have enabled commercial production of high-quality thin films of LiNbO$_3$ on SiO$_2$, including the LNOI material used for this work, which provide a large refractive index contrast that can lead to tight optical confinement and high-density integrated photonic components. As a second-order nonlinear material, LiNbO$_3$ waveguides have substantial higher maximum conversion efficiencies compared with third-order nonlinear processes in silicon, silicon nitride, and silica, and, as a ferroelectric material, LiNbO$_3$ can be periodically poled to enable phase matching over a broad frequency range.

The capability to fabricate micron-scale LiNbO$_3$ waveguides, as demonstrated here, provides an important technological capability for the development of integrated nonlinear photonic devices with the low mass and volume required for many spacecraft platforms. The integrated LiNbO$_3$ technology described herein is enabling for high-speed modulators, photonic phased arrays, optical frequency combs, optical frequency doublers, and parametric oscillators. These devices are essential building blocks for many systems needed for space exploration and terrestrial applications, including comb-based frequency standards, spectroscopy sources from ultraviolet to mid-infrared wavelengths, dynamic beam forming, and optical communications.

b. Example Nonlinear Gain Region Including Phase Matched Structure and Poling

An example process for the reversal of polarization domains within a thin-film lithium niobate crystal has been developed. This includes patterning of metallic electrodes micron features on top of the thin-film material for the application of a large pulsed voltage (~300V) across the patterned electrodes. The samples were characterized by nonlinear confocal microscopy.

Figure 19B:
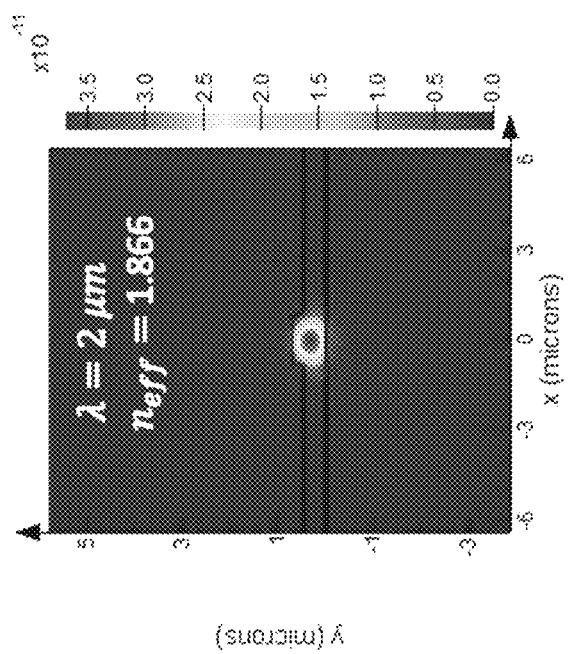
FIG. 19B. Simulated mode profile and effective refractive index of the signal in the phase matched region.
Figure 19A:
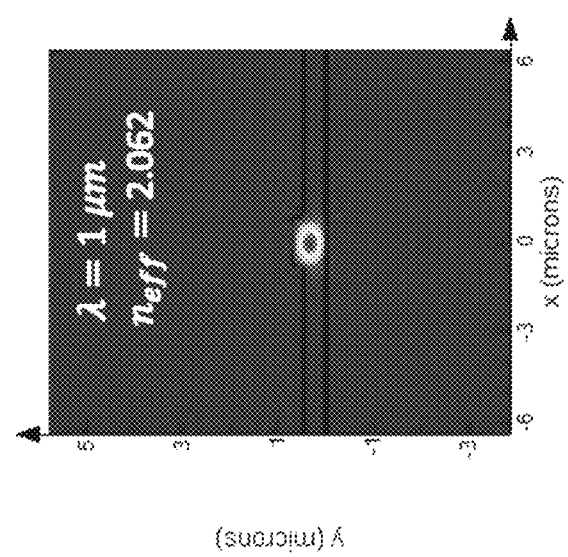
FIG. 19A. Simulated mode profile and effective refractive index of the pump in the phase matched region.

As a first step, we determined the poling period necessary for quasi-phase matching based on modal simulations of the lithium-niobate waveguides at 1 micrometer and 2 micrometer wavelengths. The fundamental mode profiles at both wavelengths are shown in FIG. 19A and FIG. 19B, along with the effective refractive index in each case. The poling period can be found from the following equation:

$$\Lambda = \frac{\lambda_{2\omega}}{n_{2\omega} - n_\omega}$$

where $\lambda_{2\omega}$ is the pump wavelength, $n_{2\omega}$ is the refractive index for the pump and $n_\omega$ is the refractive index of the output (signal or idler). In this case, the poling period is 5.1 micrometers.

Metal electrodes were patterned on the thin-film chips using a lift-off process based on e-beam lithography with a bilayer PMMA resist and e-beam evaporation of 15 nm of chromium and 100 nm of gold.

Next, we implemented a laboratory setup for the application of a large voltage pulse (~300V) across the metal electrodes. The setup is shown in FIGS. 20A-20C and comprises a signal generator, a high voltage amplifier, an oscilloscope used to monitor the voltage and current out of the amplifier, mechanical stages to host the sample and the probe needles used to contact the sample, and an optical microscope.

Figure 21:
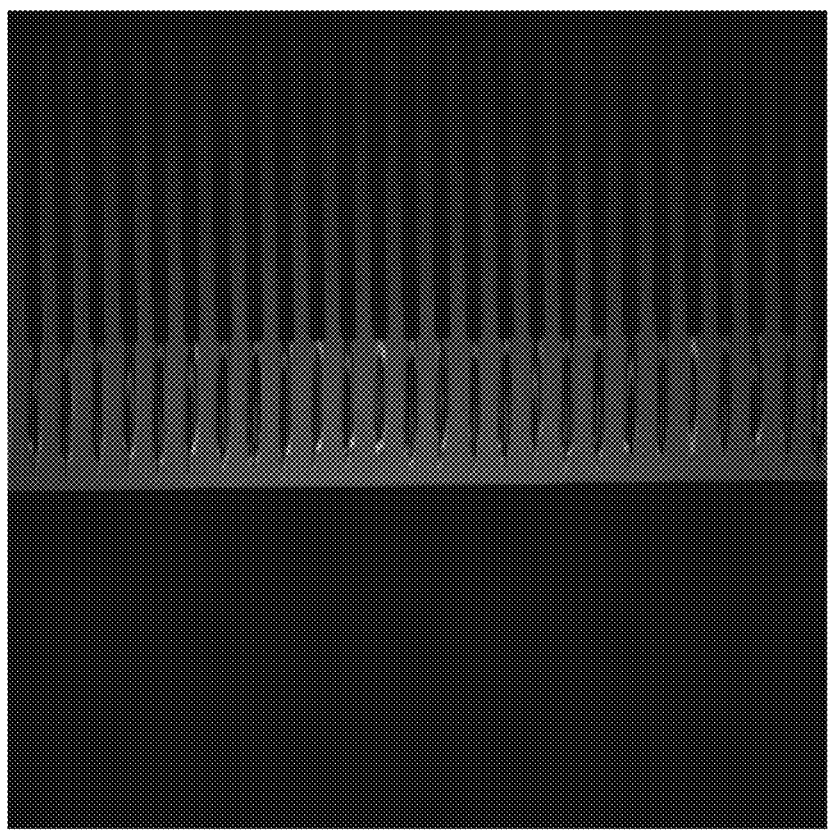
FIG. 21. Two photon microscope image of the nonlinear gain region comprising poled lithium niobate.

In order to verify that the voltage applied was indeed inverting the ferroelectric domains along the sample, we used a nonlinear laser scanning confocal microscope to obtain sample pictures (FIG. 21) displaying evidence of periodic ferroelectric domain inversion. The blueish hue in FIG. 21 indicates the presence of second harmonic generation; this is the initial state of a sample that hasn't been poled since the whole crystal can generate a second harmonic signal in response to an optical field. Black stripes appear after the application of the poling voltage; these indicate the presence of a domain boundary where adjacent polarizations fail to produce a significant second harmonic signal.

Obtaining the optimal condition for domain inversion required an iterative approach of voltage application and imaging. The variables explored were the peak voltage, pulse length and number of pulses applied.

c. Example Fabricated OPO

Figure 22:
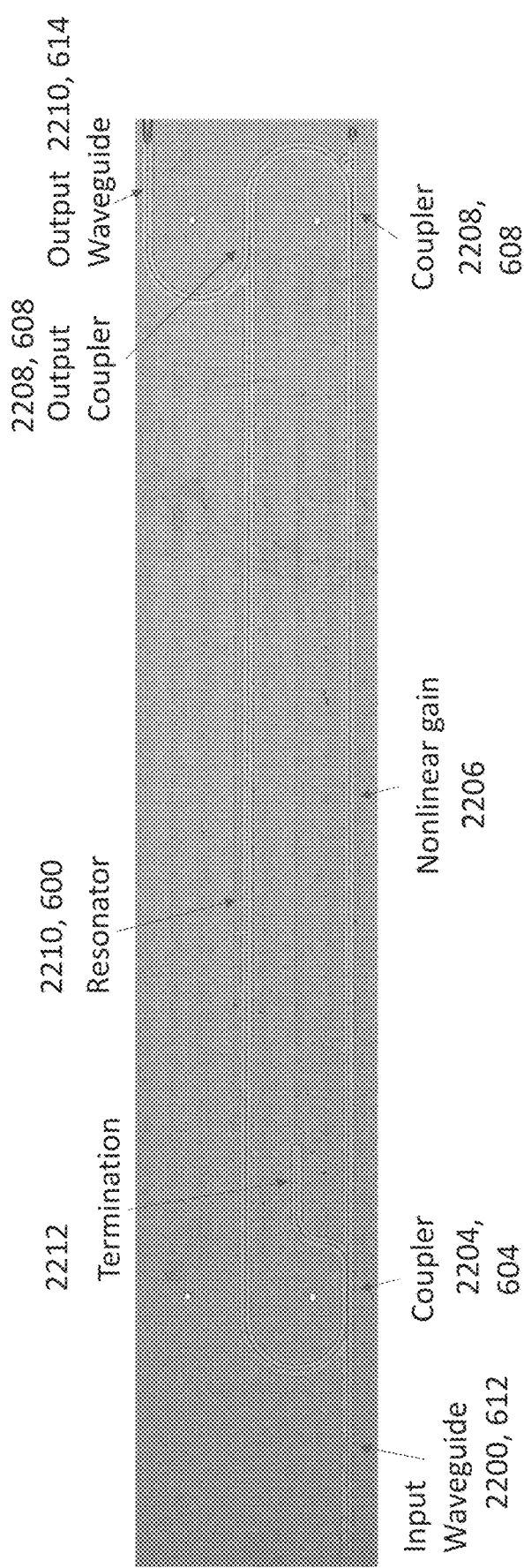
FIG. 22. Photograph of a fabricated OPO according to one or more examples.

FIG. 22 is a photograph of a fabricated OPO according to one example (referring also to FIG. 6), comprising an input waveguide 2200, 612; an input coupler 2204, 604; a nonlinear gain region 2206; output couplers 2208, 608; an output waveguide 2210, 614; a resonator 2210, 600; and a termination 2212. The thin film resonator data shown in FIGS. 17 and 18 demonstrates that electromagnetic fields can be coupled into, guided in and resonate within the waveguide and resonator of the OPO. The two photon image in FIG. 21 demonstrates successful fabrication of a nonlinear gain region including a periodically poled phase matched region.

8. Process Steps

Method of Making

Figure 23:
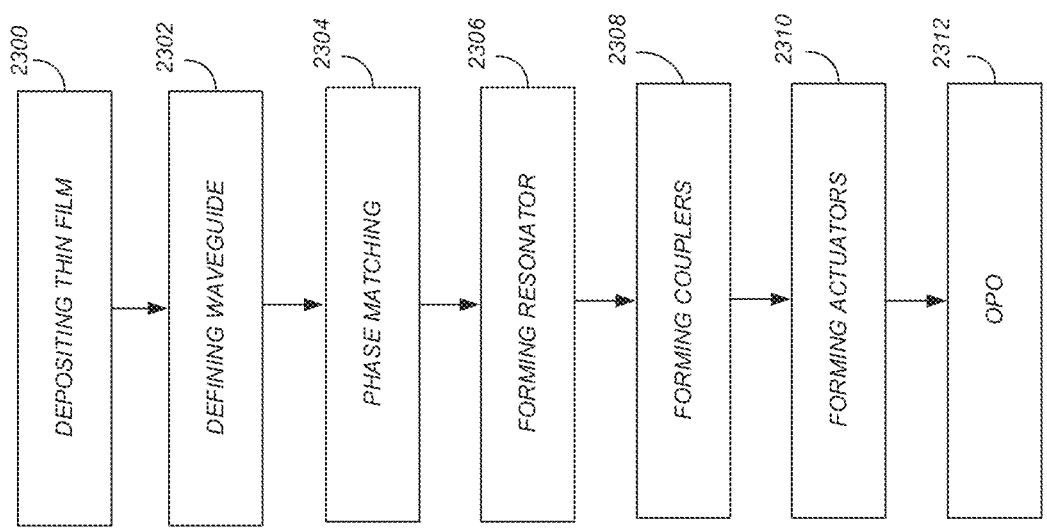
FIG. 23. Flowchart illustrating a method of making an OPO according to one or more examples.

FIG. 23 illustrates a method of making an optical parametric oscillator. The method comprises the following steps.

Block 2300 represents providing a thin film, e.g., on a substrate, the thin film including a material having a second order nonlinear susceptibility generating an electromagnetic field (e.g., output electromagnetic field) in response to an input or pump electromagnetic field, wherein the output electromagnetic field has one or more output wavelengths (e.g., a first wavelength or a first set of wavelengths) longer than one or more pump wavelengths (e.g., a second wavelength or second set of wavelengths) of the pump electromagnetic field. Examples of the pump electromagnetic field include, but are not limited to, a pump electromagnetic wave or pump electromagnetic radiation).

Block 2302 represents defining (e.g., etching) a waveguide in the thin film, wherein the waveguide has a thickness on the order of the first wavelength in the thin film waveguide so as to waveguide the output electromagnetic field along the thin film waveguide.

Block 2304 represents structuring or spatially modulating the waveguide so as to form the waveguide comprising a phase matched structure.

Block 2306 represents forming a resonator coupled to or comprising the waveguide.

Block 2308 represents optionally forming at least one coupler or mirror to couple the output electromagnetic field into the resonator.

Block 2310 represents optionally providing at least one actuator to the waveguide to tune the first wavelength.

FIGS. 15B-15C show electron micrographs of a fabricated waveguide coupled to a resonator, where a portion of the thin film layer has been etched away to define the waveguide and resonator structures.

Block 2312 represents the end result, an OPO, e.g. as illustrated in FIG. 6 or FIG. 7. The thin-film nonlinear material platform can be used to implement an (e.g., monolithic) OPO with a wide range of potential elements and functionalities, including, but not limited to the following (referring also to FIGS. 1-8).

1. An optical parametric oscillator (OPO), comprising a thin film waveguide 200 including a material having a second order nonlinear susceptibility generating an output electromagnetic field 102 in response to a pump electromagnetic field 100 inputted into the thin film waveguide, the output electromagnetic field having a first wavelength or first set of wavelengths longer than a second wavelength or second set of wavelengths of the pump electromagnetic field and the thin film waveguide having a thickness on the order of the first wavelength in the thin film waveguide so as to waveguide the output electromagnetic field along the thin film waveguide.

2. The OPO of embodiment 1, further comprising a resonator 600, 700 coupled to and/or including the thin film waveguide, wherein the resonator is configured to support resonance or resonances of the output electromagnetic field and/or the pump electromagnetic field. Examples of resonances include the fields constructively interfering within resonator.

3. The OPO of embodiment 2, wherein the resonator includes waveguide bends in order to pattern geometries like rings and racetrack resonators, or a straight section of waveguide between two reflective elements to form a geometrically linear resonator.

4. The OPO of embodiment 1, wherein the waveguide is an element configured for guiding a wide range of wavelengths (e.g., optical or infrared). These waveguides can be designed to have the desired dispersion characteristics and modal overlap between pump, signal, and idler waves.

5. The OPO of embodiment 1, wherein the thickness 202 of the thin film is less than 5 micrometers so as to guide a mode associated with the output electromagnetic field with most of its energy (at least 90%) confined in an area smaller than 5 micrometers by 5 micrometers.

6. The OPO of any of the embodiments 1-5, further comprising elements that can selectively enforce resonances for some wavelengths and eliminate resonances for others. In one or more examples, the elements comprise wavelength-selective Bragg reflectors.

7. The OPO of any of the embodiments 1-6, further comprising elements that can tune the wavelength selectivity of resonances. For instance, by electro-optic tuning of the wavelength-selective couplers or Bragg reflectors.

8. The OPO of any of the embodiments 1-7, further comprising elements that can tune the spectral properties of the nonlinear gain. For instance, by electro-optic or piezoelectric tuning of the nonlinear gain.

9. The OPO of any of the embodiments 1-8, further comprising elements that can adjust the strengths of the resonances. For instance, by electro-optic, piezoelectric, or thermoelectric tuning of the input or output couplers, or by polarization rotation. 10. The OPO of any of the embodiments 1-9, wherein the resonator includes a coupler or a plurality of couplers 604, 608 capable of coupling different spectral contents of the output electromagnetic field or the pump electromagnetic field into and out of the resonator.

11. The OPO of embodiment 10, wherein the couplers 604, 608 are directional couplers and the wavelength selectivity (e.g., of the electromagnetic field, of the first wavelength or the first set of wavelengths) is tuned by the gap size 606 between two waveguides or between the waveguide sections of the directional couplers (e.g., the gap size between the thin film waveguide and the resonator).

12. The OPO of embodiment 11, wherein the resonator only supports resonances for the output electromagnetic field by setting the length 607 of the directional couplers long enough, taking into account the first wavelength of the output electromagnetic field has a wider mode that couples differently into the resonator than the pump electromagnetic field.

13. The OPO of any of the embodiments 1-12, wherein the output electromagnetic field comprises an idler electromagnetic field and a signal electromagnetic field, and the couplers are designed so that at least one of the idler electromagnetic field or the signal electromagnetic field resonate in the resonator.

13. The OPO of any of the embodiments 1-13, wherein the thin film waveguide comprises a cavity 700 bounded by reflectors, wherein the reflectors are configured to create resonances for the output electromagnetic field and/or the pump electromagnetic field, in the cavity.

14. The OPO of any of the embodiments 1-13, further comprising an actuator 608 coupled to the thin film waveguide, the couplers, or parts of the resonator, wherein the actuator can tune some of the operation behaviors of the OPO, for instance the first wavelength or a subset of the first set of wavelengths, for instance by changing the refractive index of a portion of the thin film waveguide or the resonator.

15. The OPO of any of the embodiments 1-14, further comprising elements (e.g., actuators) coupled to the thin film waveguide, wherein the elements can tune the frequencies of resonances (or the first wavelength or first set of wavelengths of the output electromagnetic field). Examples include electro-optic, thermoelectric, or piezoelectric actuators tuning or changing the resonator's optical path length or refractive index of the thin film waveguide). Example elements or actuators include, but are not limited to, tuning electrodes or a resistive element within the resonator path.

16. The OPO of any of the embodiments 1-15, further comprising an actuator coupled to the thin film waveguide, wherein the resonator comprises a ring resonator and the actuator is configured to tune an optical path length of the resonator so as to change the overlap of the time of arrival of pulse(s) of the output electromagnetic field and the pulse(s) of the pump electromagnetic field, on each round trip of the output electromagnetic field around the ring resonator.

17. The OPO of any of the embodiments 1-16, wherein the thin film waveguide and/or the resonator includes a phase matched section that is phase matched for the nonlinear interactions between the input (pump) electromagnetic field and the output electromagnetic field, so as to achieve parametric gain of the output electromagnetic field in the thin film waveguide and/or the resonator.

18. The OPO of embodiment 17, wherein the phase matching for the nonlinear interactions is achieved by quasi-phase matching, for instance using periodic poling or orientation patterning of portions of the waveguide and/or the resonator.

19. The OPO of any of the embodiments 1-18, wherein the material with the second order nonlinear susceptibility is a ferroelectric material such as lihtium niobate, lithium tantalate, or KTP.

20. The OPO of any of the embodiments 1-19, further comprising one or more elements (e.g., a wavelength selective coupler) coupled to the thin film waveguide, wherein the elements are configured to route different spectral portions of the output electromagnetic field to different outputs from the thin film waveguide.

21. The OPO of any of the embodiments 1-20, further comprising elements that can actively introduce new frequencies to one or a combination of the interacting fields. For instance, through electro-optic modulation.

22. The OPO of any of the embodiments 1-21, further comprising elements that can lead to active or passive mode-locking of the OPO.

23. The OPO of any of the embodiments 1-22, further comprising a photonic integrated circuit or chip including the thin film waveguide on a substrate.

24. The OPO of any of the embodiments 1-23, wherein the waveguide and/or resonator are formed using a lithographic process, using a photosensitive resist with light exposure through a patterned mask or a resist sensitive to exposure with an electron beam, and a portion of the thin film structure has been etched away using a chemical and/or mechanical etching process.

Method of Operating

Figure 24:
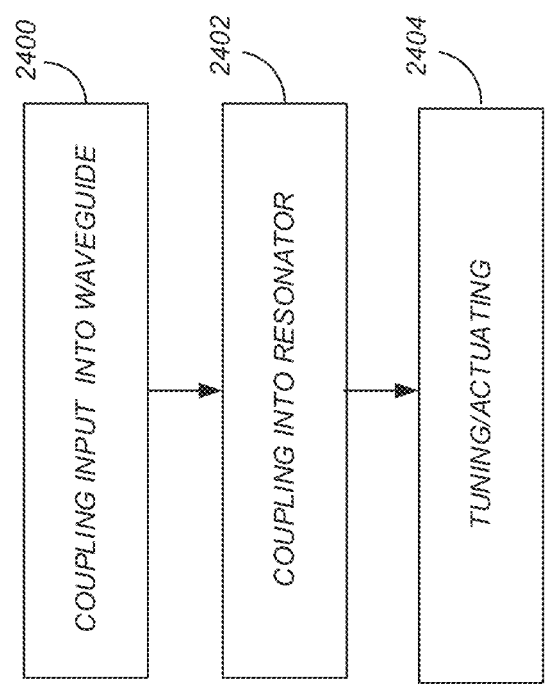
FIG. 24. Flowchart illustrating a method of operating an OPO according to one or more examples.

FIG. 24 is a flowchart illustrating a method of operating an optical parametric oscillator (e.g., as illustrated in FIG. 6, 7, or 15).

Block 2400 represents coupling input (pump) electromagnetic field into an optical parametric oscillator comprising a thin film waveguide including a material having a second order nonlinear susceptibility generating an output electromagnetic field in response to the pump electromagnetic field, wherein the output electromagnetic field has a first wavelength or first set of wavelengths longer than a second wavelength or second set of wavelengths of the pump electromagnetic field and the thin film waveguide has a thickness on the order of the first wavelength in the thin film waveguide so as to waveguide the output electromagnetic field along the thin film waveguide.

Block 2402 represents optionally coupling the output electromagnetic field into the resonator.

Block 2404 represents tuning one or more behaviors of the OPO.

From a functional perspective, the method can be used to produce a variety of OPOs, including, but not limited to, the following.

1. A doubly resonant, degenerate OPO in which the signal and the idler have the same frequency, both resonating within the OPO at $\omega_i=\omega_s=\omega_p/2$. In other words, the first wavelength is twice the second wavelength, or one of wavelengths of the first set of wavelengths is twice one of the wavelengths of the second set of wavelengths.

2. A singly resonant, non-degenerate OPO in which the signal and idler have different frequencies, and only one of them resonates within the OPO.

3. A doubly resonant, non-degenerate OPO in which the signal and idler have different frequencies, but both of them resonate within the OPO. In this case both resonate within the same resonator, or in two different resonators with different optical lengths.

4. A triply resonant OPO, wherein the pump, the signal, and the idler resonate within the OPO, e.g., using one, two, or three resonators. The OPO could be degenerate or non-degenerate.

5. A broadband OPO, wherein the output electromagnetic field of the OPO comprises a large portion of the optical or electromagnetic spectrum. In particular, in a non-degenerate OPO the bandwidth of the signal and idler could overlap with each other, generating a supercontinuum.

6. CW or pulsed OPOs. In the any of the previously mentioned OPOs, the pump wave can be continuous (CW) or pulsed.

7. OPOs generating frequency combs. The above OPOs can be used to generate broadband optical frequency combs. For example, the output electromagnetic field may comprise a frequency comb comprising one set of equidistant frequency peaks. This could be done from a pulsed pump wave (for instance, from a mode-locked laser or from electro-optic modulation of a CW laser); or it could be done directly from a continuous (CW) pump wave by modulation instability within the OPO [13].

8. In one example, the output spectrum of the output electromagnetic field is broader than the input spectrum of the pump electromagnetic field, in frequency units measured at the 30-dB level below the peak.

Advantages and Improvements

Compared to other monolithic OPOs, for instance whispering gallery mode resonators fabricated from monolithic bulk [14] or III-V [15] materials, embodiments of the present invention enable tunability and wavelength selectivity of the OPO resonator(s). For a wide range of functionalities and applications these capabilities are essential, including the generation of quantum states of light and phase-locked optical frequency combs.

The present invention brings all possible configurations and capabilities for OPOs that have been utilized and demonstrated on the table-top setups to the chip-scale.

The present invention also brings new possibilities to the operation of OPOs that are not easily accessible in any other configuration or platform. These include: tuning the spectral selectivity of the resonator, fast tuning of phase matching conditions, dispersion engineering for different wavelength regimes, extremely large non-linearity with potential tunability, and tuning of the amount of output coupling from the OPO.

References

The following references are incorporated by reference herein.

1. Lin Chang et al, "Thin film wavelength converters for photonic integrated circuits". EN. In: *Optica* 3.5 (May 2016), pp. 531-535. issn: 2334-2536. doi: 10.1364/OPTICA.3.000531. url: https://www.osapublishing.org/optica/abstract.cfm?uri=optica-3-5-531.

2. Cheng Wang et al. "Ultrahigh-efficiency wavelength conversion in nanophotonic periodically poled lithium niobate waveguides". EN. In: *Optica* 5.11 (November 2018), pp. 1438-1441. issn: 2334-2536. doi: 10.1364/OPTICA.5.001438. url: https://www.osapublishing.org/optica/abstract.cfm?uri=optica-5-11-1438.

3. S. Roux et al. "Low-loss orientation-patterned GaSb waveguides for mid-infrared parametric conversion". EN. In: *Optical Materials Express* 7.8 (August 2017), pp. 3011-3016. issn: 2159-3930. doi: 10.1364/OME. 7.003011. url: https://www.osapublishing.org/ome/abstract.cfm?uri=ome-7-8-3011.

4. K. A. Fedorova et al. "Second harmonic generation in a low-loss orientation-patterned GaAs waveguide". EN. In: *Optics Express* 21.14 (July 2013), pp. 16424-16430. issn: 1094-4087. doi: 10.1364/OE. 21.016424. url: https://www.osapublishing.org/oe/abstract.cfm?uri=oe-21-14-16424.

5. Lin Chang et al. "Heterogeneously Integrated GaAs Waveguides on Insulator for Efficient Frequency Conversion". en. In: *Laser & Photonics Re-views* 12.10 (October 2018). issn: 1863-8899. doi: 10.1002/lpor.201800149. url: https://onlinelibrary.wiley.com/doi/abs/10.1002/lpor.201800149.

6. Jeff Chiles and Sasan Fathpour. "Mid-infrared integrated waveguide modulators based on silicon-on-lithium-niobate photonics". EN. In: *Optica* 1.5 (November 2014), pp. 350-355. issn: 2334-2536. doi: 10.1364/OPTICA.1.000350. url: https://www.osapublishing.org/optical/abstract.cfm?uri=optica-1-5-350.

7. A. Rao and. S. Fathpour. "Heterogeneous Thin-Film Lithium Niobate Integrated Photonics for Electrooptics and Nonlinear Optics". In: *IEEE Journal of Selected Topics in Quantum Electronics* 24.6 (November 2018), pp. 1-12. issn: 1077-260X. doi: 10.1109/JSTQE.2018.2836939.

8. Cheng Wang et al. "Second-harmonic generation in nanophotonic PPLN waveguides with ultrahigh efficiencies". EN. In: *Conference on Lasers and Electro-Optics* (2018), *paper JTh5A.2*. Optical Society of America, May 2018, JTh5A.2. doi: 10.11.364/CLEO_AT.2018.JTh5A.2. url: https://www.osapublishing.org/abstract.cfm?uri=CLEO_SI-2018-JTh5A.2. Peter G. Schunemann, Daniel J. Magarrell, and Leonard A. Pomeranz. "HVPE of Orientation-Patterned Gallium Phosphide (OP-GaP) with Novel Quasi-Phasematched Device Structures". EN. In: *Conference on Lasers and Electro-Optics* (2018), *paper STh4F.1*. Optical Society of America, May 2018, STh4F.1. doi: 10.1364/CLEO_SI. 2018. STh4F.1.url: https://www.osapublishing.org/abstract.cfm?uri=CLEO_SI-2018-STh4F.1.

9. Xin Chen et al. "Quasi-phase matching via femtosecond laser-induced domain inversion in lithium niobate waveguides". EN. In: *Optics Letters* 41.11 (June 2016), pp. 2410-2413. issn: 1539-4794. doi: 10.1364/OL.41.002410. url: https://www.osapublishing.org/ol/abstract.cfm?uri=ol-41-11-2410.

10. Dunzhao Wei et al. "Experimental demonstration of a three-dimensional lithium niobate nonlinear photonic crystal". En. In: *Nature Photonics* 12.10 (October 2018), p. 596. issn: 1749-4893. doi: 10.1038/s41566-018-0240-2. url: https://www.nature.com/articles/s41566-018-0240-2.

11. Cheng Wang et al. "Integrated lithium niobate electro-optic modulators operating at CMOS-compatible voltages". En. In: *Nature* 562.7725 (October 2018), p. 101. issn: 1476-4687. doi: 10.1038/s41586-018-0551-y.url: https://www.nature.com/articles/s41586-018-0551-y.

12. S. Mosca et al. "Modulation Instability Induced Frequency Comb Generation in a Continuously Pumped Optical Parametric Oscillator". en. In: *Physical Review Letters* 121.9 (August 2018). issn: 0031-9007, 1079-7114. doi: 10.1103/PhysRevLett.121.093903. url: https://link.aps.org/doi/10.1103/PhysRevLett.121.093903.

13. Robert C. Eckardt et al. "Optical parametric oscillator frequency tuning and control". en. In: *Journal of the Optical Society of America B* 8.3 (March 1991), p. 646. issn: 0740-3224, 1520-8540. doi: 10.1364/JOSAB.8.000646. url: https://www.osapublishing.org/abstract.cfm?URI=josab-8-3-646.

Nima Zareian and Amr S. Helmy. "Static and dynamic characteristics of integrated semiconductor optical parametric oscillators". EN. In: *JOSA B* 30.8 (August 2013), pp. 2306-2317. issn: 1520-8540. doi: 10.1364/JOSAB. 30.002306. url: https://www.osapublishing.org/josab/abstract.cfm?uri=josab-30-8-2306.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A chip, comprising:
an optical parametric oscillator (OPO), comprising:
a thin film waveguide including a material having a second order nonlinear susceptibility generating an output electromagnetic wave in response to a pump electromagnetic wave inputted into the thin film waveguide, wherein:

the output electromagnetic wave has one or more output wavelengths longer than one or more pump wavelengths of the pump electromagnetic wave, and the thin film waveguide has a thickness on the order of the one or more output wavelengths in the thin film waveguide so as to waveguide the output electromagnetic wave along the thin film waveguide, the thin film waveguide comprises a ridge having a width and a thickness guiding a mode associated with the output electromagnetic wave with most of its energy confined in a transverse cross-sectional area smaller than 5 micrometers by 5 micrometers, the OPO comprises a resonator at least coupled to or including the thin film waveguide, and the resonator is configured to support one or more resonances of at least the output electromagnetic wave or the pump electromagnetic wave.

2. The chip of claim 1, wherein the thickness of the thin film waveguide is less than 5 micrometers.

3. The chip of claim 1, wherein at least 90% of the energy is confined in the transverse cross-sectional area.

4. The chip of claim 3, wherein the resonator includes one or more couplers capable of coupling different spectral contents of the output electromagnetic wave or the pump electromagnetic wave into and out of the resonator.

5. The chip of claim 4, wherein the couplers are directional couplers and their wavelength selectivity is tuned by a gap size between the waveguide sections of the directional couplers.

6. The chip of claim 5, wherein the resonator only supports resonances for the output electromagnetic wave by setting the length of the directional couplers long enough, taking into account the one or more output wavelengths of the output electromagnetic wave having a wider mode that couples differently into the resonator than the pump electromagnetic wave.

7. The chip of claim 5, wherein the output electromagnetic wave comprises an idler electromagnetic wave and a signal electromagnetic wave, and the couplers are designed so that at least one of the idler electromagnetic wave or the signal electromagnetic wave resonate in the resonator.

8. The chip of claim 4, further comprising an actuator coupled to the thin film waveguide, the couplers, or parts of the resonator, wherein the actuator can tune at least an effective refractive index of the pump electromagnetic wave or an effective refractive index of the output electromagnetic wave in at least a portion of the resonator, the couplers, or the waveguide.

9. The chip of claim 4, further comprising an actuator coupled to the thin film waveguide, wherein the resonator comprises a ring resonator and the actuator is configured to tune an optical path length of the resonator so as to change the overlap of the time of arrival of a pulse of the output electromagnetic wave and a pulse of the pump electromagnetic wave, on each round trip of the output electromagnetic wave around the ring resonator.

10. The chip of claim 3, wherein: at least one of the waveguide or the resonator are designed for degenerate operation such that at least one of the output wavelengths is twice at least one of the pump wavelengths.

11. The chip of claim 3, wherein at least one of the waveguide or the resonator are designed such that the output electromagnetic wave comprises a frequency comb comprising a set of equidistant frequency peaks.

12. The chip of claim 3, wherein at least one of waveguide or the resonator are designed such that an output spectrum of the output electromagnetic wave is broader than the input spectrum of the pump electromagnetic wave, in frequency units measured at the 30-dB level below the peak.

13. The chip of claim 1, wherein the thin film waveguide comprises a cavity bounded by reflectors, wherein the reflectors are configured to create resonances in the cavity for at least the output electromagnetic wave or the pump electromagnetic wave.

14. The chip of claim 1, wherein at least one of the thin film waveguide or the resonator includes a phase matched section that is phase matched for a nonlinear interaction between the pump electromagnetic field and the output electromagnetic field, so as to achieve parametric gain of the output electromagnetic field in the thin film waveguide and/or a resonator coupled to the thin film waveguide.

15. The chip of claim 14, wherein the phase matching for the nonlinear interactions is achieved by quasi-phase matching.

16. The chip of claim 1, wherein the material with the second order nonlinear susceptibility is a ferroelectric material.

17. The chip of claim 1, further comprising a photonic integrated circuit including the thin film waveguide on a substrate.

18. The chip of claim 1, wherein the pump electromagnetic wave comprises a continuous wave or a pulsed electromagnetic wave.

19. A method of operating an optical parametric oscillator, comprising:

coupling a pump electromagnetic wave into an optical parametric oscillator comprising a thin film waveguide including a material having a second order nonlinear susceptibility generating an output electromagnetic wave in response to the pump electromagnetic wave, wherein:

the electromagnetic wave has one or more output wavelengths longer than one or more pump wavelengths of the pump electromagnetic wave, the thin film waveguide has a thickness on the order of the one or more output wavelengths in the thin film waveguide so as to waveguide the output electromagnetic wave along the thin film waveguide, and the thin film waveguide comprises a ridge having a width and the thickness guiding a mode associated with the output electromagnetic wave with most of its energy confined in a transverse cross-sectional area smaller than 5 micrometers by 5 micrometers, the OPO comprises a resonator at least coupled or including the thin film waveguide, and the resonator is configured to support one or more resonances of at least the output electromagnetic wave or the pump electromagnetic wave.

20. A method of making an optical parametric oscillator, comprising:

providing a thin film on a substrate, the thin film including a material having a second order nonlinear susceptibility generating an output electromagnetic field in response to a pump electromagnetic field, wherein the generated output electromagnetic field has one or more output wavelengths longer than one or more pump wavelengths of the pump electromagnetic field, and the thin film has a thickness on the order of the one or more output wavelengths;

defining a waveguide in the thin film, and the thin film comprises a ridge having a width and a thickness guiding a mode associated with the output electromagnetic wave with most of its energy confined in a transverse cross-sectional area smaller than 5 micrometers by 5 micrometers;

structuring or spatially modifying the thin film so as to form a thin film waveguide comprising a phase matching structure; and forming a resonator coupled to or comprising the waveguide.

21. The method of claim 20, further comprising providing one or more actuators to tune an effective refractive index of the pump electromagnetic field and/or an effective refractive index of the output electromagnetic field in at least a portion of the resonator.

22. The method of claim 20, wherein the waveguide and the resonator are formed using a lithographic process and etching to remove a portion of the thin film.

\* \* \* \* \*